United States Patent
Gu et al.

(10) Patent No.: US 10,484,434 B2
(45) Date of Patent: *Nov. 19, 2019

(54) TRUNKING COMMUNICATION SYSTEM, TRUNKING SERVER, ACCESS NETWORK AND TRUNKING COMMUNICATION METHOD

(71) Applicant: Huawei Technologies Co., Ltd., Shenzhen, Guangdong (CN)

(72) Inventors: Rongting Gu, Shanghai (CN); Hua Wen, Shanghai (CN); Qian Zhu, Shenzhen (CN); Jing Li, Shanghai (CN); Yihua Li, Shenzhen (CN); Qiting Xie, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/782,643

(22) Filed: Oct. 12, 2017

(65) Prior Publication Data
US 2018/0034861 A1   Feb. 1, 2018

Related U.S. Application Data

(63) Continuation of application No. 14/697,005, filed on Apr. 27, 2015, now Pat. No. 9,813,456, which is a
(Continued)

(51) Int. Cl.
*H04L 29/06* (2006.01)
*H04W 8/18* (2009.01)
(Continued)

(52) U.S. Cl.
CPC ........ *H04L 65/1046* (2013.01); *H04L 65/103* (2013.01); *H04L 65/1069* (2013.01);
(Continued)

(58) Field of Classification Search
CPC .... H04L 65/1046; H04L 65/103; H04L 65/80
(Continued)

(56) References Cited

U.S. PATENT DOCUMENTS 9,386,077 B2 *   7/2016   Kotecha .................. H04L 67/10

FOREIGN PATENT DOCUMENTS

| CN | 101060664 A | 10/2007 |
|---|---|---|
| CN | 101453696 A | 6/2009 |

(Continued)

*Primary Examiner* — Glenford J Madamba
(74) *Attorney, Agent, or Firm* — Fish & Richardson P.C.

(57) ABSTRACT

A trunking communication system, a server, an access network and a trunking communication method are disclosed. The system includes a trunking management server and an access network, the trunking management server includes a trunking call service control module and a connected trunking call media gateway module, where: the trunking call media gateway module is configured to receive service data sent through the access network by a trunking UE, and forward the service data according to a communication type of the service data for implementing user plane communication of the trunking UE; and the trunking call service control module is configured to receive a communication request sent through the access network by a trunking UE, and perform call control and bearer management on the trunking UE according to a communication type of the communication request for implementing control plane communication of the trunking UE.

11 Claims, 19 Drawing Sheets

Related U.S. Application Data continuation of application No. PCT/CN2012/083521, filed on Oct. 25, 2012.

(51) Int. Cl.
| | | |
|---|---|---|
| *H04W 4/60* | (2018.01) | |
| *H04W 84/08* | (2009.01) | |
| *H04W 4/08* | (2009.01) | |
| *H04W 4/10* | (2009.01) | |

(52) U.S. Cl.
CPC ............... *H04L 65/80* (2013.01); *H04W 4/60* (2018.02); *H04W 8/18* (2013.01); *H04W 4/08* (2013.01); *H04W 4/10* (2013.01); *H04W 84/08* (2013.01)

(58) Field of Classification Search
USPC .......................................................... 709/219
See application file for complete search history.

(56) References Cited

FOREIGN PATENT DOCUMENTS

| | | | | | |
|---|---|---|---|---|---|
| CN | 101616364 | A | | 12/2009 | |
| CN | 102111722 | A | | 6/2011 | |
| CN | 102457813 | A | * | 5/2012 | ............ H04W 76/45 |
| CN | 102457813 | A | | 5/2012 | |
| CN | 102469415 | A | * | 5/2012 | ............ H04W 76/40 |
| CN | 102469415 | A | | 5/2012 | |
| EP | 2659706 | A | | 11/2013 | |
| EP | 2659706 | A1 | * | 11/2013 | ............ H04W 28/16 |

\* cited by examiner

TRUNKING COMMUNICATION SYSTEM, TRUNKING SERVER, ACCESS NETWORK AND TRUNKING COMMUNICATION METHOD

CROSS-REFERENCE TO RELATED APPLICATIONS

This application is a continuation of U.S. patent application Ser. No. 14/697,005, filed on Apr. 27, 2015, which is a continuation of International Application No. PCT/CN2012/083521, filed on Oct. 25, 2012. The disclosures of the aforementioned applications are hereby incorporated by reference in their entireties.

TECHNICAL FIELD

Embodiments of the present invention relates to the field of communications technologies, and in particular, to a trunking communication system, a trunking server, an access network and a trunking communication method.

BACKGROUND

Trunking communication is calling between a flock of or a group of users, and a conventional trunking communication system cannot satisfy demands of various broadband services, such as a video call, and picture transmission. With development of an advanced mobile broadband communication system such as a long term evolution (LTE) system, the prior art, such as, the push to talk over cellular (POC) technology, takes the trunking communication as an upper layer application service borne by an LTE network, both control plane management and user plane data of the trunking communication are borne at a user plane of an LTE access network. When the trunking communication is performed, the LTE network pages terminals in a group one by one, and a downlink service is sent to the terminals in the group in a unicast manner.

The trunking communication system is a radio mobile communication system in which a dynamic channel assignment manner can be implemented to achieve that multiple users share multiple channels, and the system has functions such as scheduling, group calling, preemptive calling, virtual private network, and roaming. The trunking communication can be applied to the field of public security. In a trunking communication group, when a talker user equipment (UE) begins a call, other UEs in the group can hear call content simultaneously.

In the process of research on the prior art, the inventor finds that, in an existing trunking communication process, terminals in a group are paged in a one-by-one paging manner, so access performance and efficiency are bad; the downlink service is sent in a unicast manner, so occupancy on downlink channel resources in a system is increased.

SUMMARY

Embodiments of the present invention provide a trunking communication system, a trunking server, an access network and a trunking communication method, so as to solve a problem in the prior art that neither access performance nor access efficiency of the trunking communication system is high.

In order to solve the foregoing technical problem, the embodiments of the present invention disclose the following technical solutions.

In a first aspect, a trunking communication system is provided, including: a trunking management server and an access network, where the trunking management server includes a trunking call service control module and a connected trunking call media gateway module, the access network includes a mobile management entity MME, an access network gateway and a base station eNodeB which communicate with each other, and the access network gateway includes a multimedia broadcast multicast service MBMS gateway and a public data network PDN gateway that communicate with the trunking call media gateway module, where the trunking call media gateway module communicates with the access network gateway;

the trunking call media gateway module is configured to receive service data sent through the access network by a trunking user equipment UEs, and forward the service data according to a communication type of the service data, so as to implement user plane communication of the trunking UE; and the trunking call service control module is configured to receive a communication request sent through the access network by a trunking UE, and perform call control and bearer management on the trunking UE according to a communication type of the communication request, so as to implement control plane communication of the trunking UE.

In combination with the first aspect, in a first possible implementation manner, the access network gateway further includes: a serving gateway communicating with the PDN gateway, where each of the serving gateway and the MBMS gateway communicates with the eNodeB and the MME; and the access network further includes: a multi-service customer edge MCE communicating with the MME and the eNodeB separately; and In combination with the first possible implementation manner, in a second possible implementation manner, the trunking call service control module communicates with the MME through an SGt interface, or the trunking call service control module communicates with the MBMS gateway through an SGmb interface; the trunking call media gateway module communicates with the MBMS gateway through an SGmb-i interface; the trunking call media gateway module communicates with the PDN gateway through an SGi interface.

In combination with the first possible implementation manner, or the second possible implementation manner, in a third possible implementation manner, the PDN gateway, the MBMS gateway and the serving gateway are integrated in one network element; or the MME and the MCE are integrated in one network element; or the trunking attribute management module and the trunking call service control module are integrated in one network element.

In combination with the first possible implementation manner, or the second possible implementation manner, or the third possible implementation manner, in a fourth possible implementation manner, the trunking call media gateway module is specifically configured to: when the communication type is point-to-point communication, send, to the PDN gateway, service data sent by a talker UE among the trunking UEs, where the PDN gateway forwards, through the serving gateway, the service data to an eNodeB where a called UE among the trunking UEs is located, so that the eNodeB sends the service data to the called UE; and when the communication type is point-to-multipoint communication, send, to the MBMS gateway, service data sent by a talker UE among the trunking UEs, where the MBMS gateway sends the service data to an eNodeB where a monitoring UE among the trunking UEs is located, so that the eNodeB multicasts the service data to the monitoring UE.

In combination with the first possible implementation manner, or the second possible implementation manner, or the third possible implementation manner, or the fourth possible implementation manner, in a fifth possible implementation manner, the trunking call service control module is specifically configured to: when the communication type is point-to-point communication, send a unicast bearer establishment request or unicast bearer release request of a trunking UE to the PDN gateway, so that the PDN gateway establishes an EPS bearer for the UE, or releases an established evolved packet system EPS bearer; and when the communication type is point-to-multipoint communication, send a trunking service initiation request of the trunking UE to the MBMS gateway through the trunking call media gateway module, where the MBMS gateway forwards the request to the MCE through the MME, so that the MCE establishes a downlink multicast bearer for the trunking service according to the request, and allocates a resource to the trunking service.

In combination with the first aspect, or the first possible implementation manner, or the second possible implementation manner, or the third possible implementation manner, or the fourth possible implementation manner, or the fifth possible implementation manner, in a sixth possible implementation manner, the trunking management server further includes: a trunking information management module and a trunking attribute management module which are connected to the trunking call service control module separately;

the trunking information management module is configured to manage definition, storage and update of trunking UE information and trunking subscription information, where the subscription information includes a group identifier, a group UE list, a trunking UE identity identifier, and a trunking UE priority definition; and the trunking attribute management module is configured to manage definition, storage, and update of group attribute information, where the attribute information includes a group identifier, a group priority, a group area, and a group service type.

In a second aspect, a trunking management server is provided, and the server includes: a trunking call service control module and a connected trunking call media gateway module, where the trunking call media gateway module is configured to receive service data sent through the access network by a trunking UE, and forward the service data according to a communication type of the service data, so as to implement user plane communication of the trunking UE; and the trunking call service control module is configured to receive a communication request sent through the access network by a trunking UE, and perform call control and bearer management on the trunking UE according to a communication type of the communication request, so as to implement control plane communication of the trunking UE.

In combination with the second aspect, in a first possible implementation manner, the trunking call media gateway module is specifically configured to: when the communication type is point-to-point communication, forward service data, sent by a talker UE among the trunking UEs, to a called UE among the trunking UEs through the access network; and when the communication type is point-to-multipoint communication, multicast service data, sent by a talker UE among the trunking UEs, to a monitoring UE among the trunking UEs through the access network.

In combination with the second aspect, or the first possible implementation manner, in a second possible implementation manner, the trunking call service control module is specifically configured to: when the communication type is point-to-point communication, send a unicast bearer establishment request or unicast bearer release request of a trunking UE to the access network, so that the access network establishes an EPS bearer for the UE, or releases an established EPS bearer; and when the communication type is point-to-multipoint communication, send a trunking service initiation request to the access network through the trunking call media gateway module, so that the access network establishes a downlink multicast bearer for the trunking service according to the request, and allocates a resource to the trunking service.

In combination with the second aspect, or the first possible implementation manner, or the second possible implementation manner, in a third possible implementation manner, the server further includes: a trunking information management module and a trunking attribute management module which are connected to the trunking call service control module separately, where the trunking information management module is configured to manage definition, storage and update of trunking UE information and trunking subscription information, where the subscription information includes a group identifier, a group UE list, a trunking UE identity identifier, and a trunking UE priority definition; and the trunking attribute management module is configured to manage definition, storage, and update of group attribute information, where the attribute information includes a group identifier, a group priority, a group area, and a group service type.

In a third aspect, an access network is provided, and the access network includes: an MME, an access network gateway and an eNodeB which communicate with each other, the access network gateway includes a multimedia broadcast multicast service MBMS gateway and a public data network PDN gateway that communicate with the trunking call media gateway module, where the access network gateway is configured to forward service data, sent by a trunking UE, to a trunking management server, so as to implement user plane communication of the trunking UE; and the MME is configured to forward a communication request, sent by a trunking UE, to the trunking management server, so as to implement control plane communication of the trunking UE.

In combination with the third aspect, in a first possible implementation manner, the access network gateway further includes: a serving gateway communicating with the PDN gateway, where each of the serving gateway and the MBMS gateway communicates with the eNodeB and the MME; and the access network further includes: an MCE communicating with the MME and the eNodeB separately; and In combination with the first possible implementation manner, in a second possible implementation manner, the PDN gateway is configured to: when user plane communication of the trunking UE is implemented, and a communication type is point-to-point communication, receive service data sent by a talker UE among the trunking UEs, and send the service data to the serving gateway; the serving gateway is configured to forward the service data to an eNodeB where a called UE among the trunking UEs is located; the eNodeB is configured to send the service data to the called UE; and the MBMS gateway is configured to: when user plane communication of the trunking UE is implemented, and a communication type is point-to-multipoint communication, receive service data sent by a talker UE among the trunking UEs, and send the service data to an eNodeB where a monitoring UE among the trunking UEs is located; the eNodeB is configured to multicast the service data to the monitoring UE.

In combination with the first possible implementation manner, or the second possible implementation manner, in a third possible implementation manner, the PDN gateway is configured to: when control plane communication of the trunking UE is implemented, and the communication type is point-to-point communication, receive a unicast bearer establishment request or unicast bearer release request sent by the trunking UE, and establish an EPS bearer for the UE, or release an established EPS bearer; and the MBMS gateway is configured to: when control plane communication of the trunking UE is implemented, and the communication type is point-to-multipoint communication, receive a trunking service initiation request of the trunking UE sent by the trunking management server, and send the trunking service initiation request to the MME; the MME is configured to forward the trunking service initiation request to the MCE; the MCE is configured to establish a downlink multicast bearer for a trunking service of the trunking UE according to the trunking service initiation request, and allocate a resource to the trunking service.

In a fourth aspect, a trunking communication method is provided, and the method includes:

receiving, by a trunking management server, a group establishment request sent through an access network by a first UE among trunking UEs;

allocating, by the trunking management server, an uplink bearer identifier and a downlink bearer identifier to the trunking UE according to the group establishment request; and establishing, by the trunking management server, an uplink talker bearer and a downlink multicast bearer for the first UE through the access network according to the uplink bearer identifier and the downlink bearer identifier respectively, so that a talker UE among the trunking UEs sends a talker service to a listener UE through the uplink talker bearer and the downlink multicast bearer.

In combination with the fourth aspect, in a first possible implementation manner, the establishing an uplink talker bearer for the trunking UE through an access network according to the uplink bearer identifier includes:

sending, by the trunking management server, an uplink talker bearer establishment request message containing an uplink talker bearer identifier to the access network, so that the access network allocates the uplink talker bearer identifier to the talker UE among the group UEs according to the uplink talker bearer establishment request message, establishes an uplink talker unicast bearer, and establishes a mapping between the talker unicast bearer and the uplink talker bearer identifier.

In combination with the fourth aspect, or the first possible implementation manner, in a second possible implementation manner, the establishing a downlink multicast bearer for the trunking UE through an access network according to the uplink bearer identifier and the downlink bearer identifier includes:

sending, by the trunking management server, a group call start request message to the access network, so that the access network allocates a downlink bearer identifier and an Internet protocol IP multicast address to the group according to the group call start request message, and binds the IP multicast address and the downlink bearer identifier; and sending, by the access network, a group session start request message to a base station where the group UE is located, so that the base station sends a group-based paging notification message to the group UE according to the group session start request message; and sending a group resource scheduling message to the eNodeB where the group UE is located, so that the eNodeB joins in a multicast group corresponding to the IP multicast address, and sends a group resource update notification message to the group UE according to the group resource scheduling message.

In combination with the fourth aspect, or the first possible implementation manner, or the second possible implementation manner, in a third possible implementation manner, the method further includes:

receiving, by the trunking management server, a group end request message sent by the first UE among the trunking UEs;

releasing, by the trunking management server according to the group end request message, the uplink bearer identifier and the downlink bearer identifier allocated to the trunking UE; and sending, by the trunking management server, a group call end request message to the access network, so that the access network releases the uplink talker bearer and the downlink multicast bearer established for the trunking UE.

In combination with the fourth aspect, or the first possible implementation manner, or the second possible implementation manner, or the third possible implementation manner, in a fourth possible implementation manner, the method further includes:

receiving, by the trunking management server, an uplink floor application request message sent by the talker UE among the trunking UEs, and allocating an uplink bearer identifier to the talker UE according to the uplink floor application request message;

sending, by the trunking management server, a group status update message to the access network, where the group status update message includes a group identifier of the trunking UEs, an identifier of the talker UE, talker identity information of the talker UE, and a busy status of the talker UE, so that an eNodeB of the access network multicasts the group status update message to the trunking UE; and sending, by the trunking management server, a talker bearer establishment request message to the access network, where the talker bearer establishment request message includes the uplink bearer identifier, the group identifier of the trunking UEs, the identifier of the talker UE, and the talker identity information of the talker UE, so that the access network establishes an EPS bearer for the talker UE.

In combination with the fourth possible implementation manner, in a fifth possible implementation manner, the method further includes:

receiving, by the trunking management server, an uplink floor release request message sent by the talker UE, and releasing, according to the uplink floor release request message, the uplink bearer identifier allocated to the talker UE;

sending, by the trunking management server, a group status update message to the access network, where the group status update message includes a group identifier of the trunking UEs, an identifier of the talker UE, talker identity information of the talker UE, and a free talker status of the talker UE, so that an eNodeB of the access network multicasts the group status update message to the trunking UE; and sending, by the trunking management server, a talker bearer release request message to the access network, where the talker bearer release request message includes the uplink bearer identifier, the group identifier of the trunking UEs, the identifier of the talker UE, and the talker identity information of the talker UE, so that the access network releases the EPS bearer established for the talker UE.

In combination with the fourth aspect, or the first possible implementation manner, or the second possible implementation manner, or the third possible implementation manner, or the fourth possible implementation manner, or the fifth possible implementation manner, in a sixth possible implementation manner, the method further includes:

receiving, by the trunking management server, a trunking user registration request message sent through the access network by the trunking UE, and returning a trunking user registration request response message containing an IP address of the trunking management server to the access network, so that the access network forwards the trunking user registration request response message to the trunking UE; and receiving, by the trunking management server, a trunking user registration request message sent by the trunking UE according to the IP address of the trunking management server, and returning a trunking user registration request response message to the trunking UE.

The trunking communication system in the embodiment of the present invention includes a trunking management server and an access network, the trunking management server includes a trunking call service control module and a connected trunking call media gateway module, and the access network includes an MME, an access network gateway and an eNodeB which communicate with each other, where the trunking call media gateway module receives service data sent through the access network by a trunking UE, and forwards the service data according to a communication type of the service data, so as to implement user plane communication of the trunking UE; and the trunking call service control module receives a communication request sent through the access network by the trunking UE, and performs call control and bearer management on the trunking UE according to a communication type of the communication request, so as to implement control plane communication of the trunking UE. In the embodiments of the present invention, user plane communication and control plane communication of the trunking UE can be implemented according to different communication types, so the trunking UE can be paged in a multicast manner in a trunking communication procedure, thereby improving access performance and access efficiency of the system. Correspondingly, a downlink service can be sent in a multicast manner, so occupancy on downlink channel resources in the system is also reduced.

BRIEF DESCRIPTION OF THE DRAWINGS

To illustrate the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 4A-1 and FIG. 4A-2 are a flow chart of a second embodiment of the trunking communication method according to the present invention;

DETAILED DESCRIPTION

The following embodiments of the present invention provide a trunking communication system, a trunking server, an access network and a trunking communication method.

To make the technical solutions in the embodiments of the present invention more comprehensible for persons skilled in the art, and to make the aforementioned objectives, characteristics, and advantages of the embodiments of the present invention more comprehensible, the technical solutions in the embodiments of the present invention are further described in detail below with reference to accompanying drawings.

Figure 1:
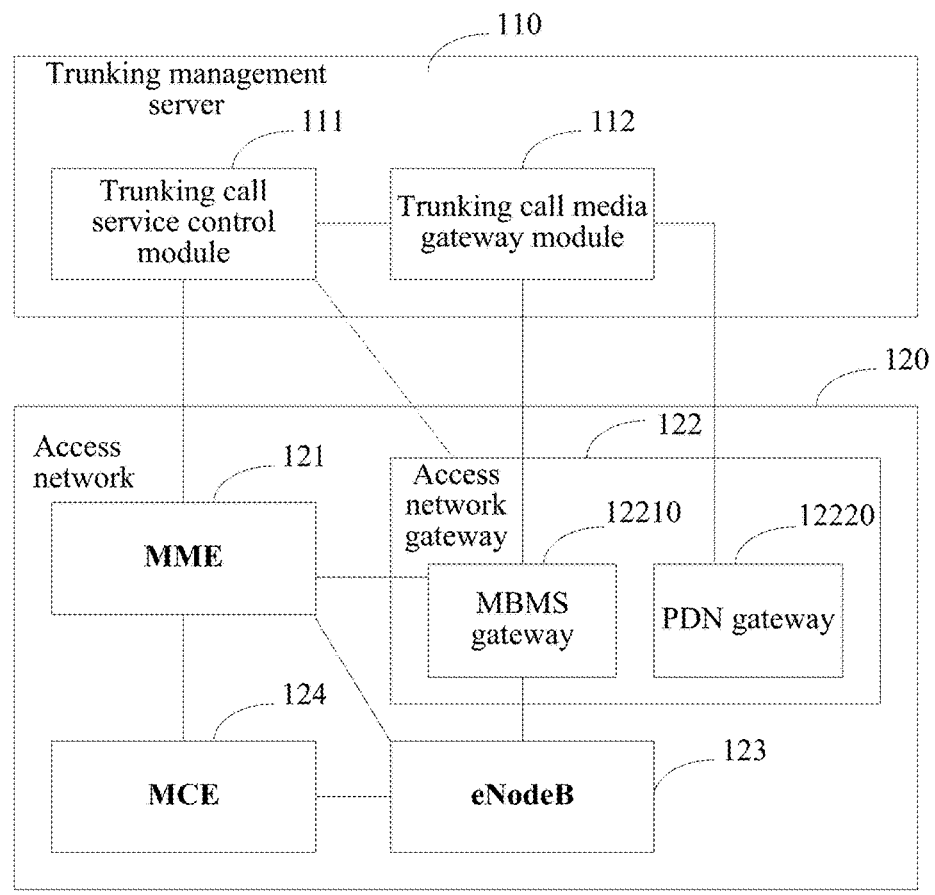
FIG. 1 is a block diagram of an embodiment of a trunking communication system according to the present invention.

FIG. 1 is a block diagram of an embodiment of a trunking communication system according to the present invention.

The trunking communication system includes: a trunking management server 110 and an access network 120, the trunking management server 110 includes a trunking call service control module 111 and a connected trunking call media gateway module 112, and the access network 120 includes a mobile management entity MME121, an access network gateway 122 and a base station eNodeB123 connected to each other. The access network gateway 122 includes an MBMS gateway 12220 and a PDN gateway 12210 that communicate with the trunking call media gateway module 111, the trunking call service control module 111 can directly communicate with the MME121, or directly communicate with the access network gateway 122, and the trunking call service control module 111 can also communicate with the access network gateway 122 through the trunking call media gateway module 112. The trunking call media gateway module 112 communicates with the access network gateway 122.

The trunking call media gateway module 112 is configured to receive service data sent through the access network 120 by a UE among trunking user equipments UEs, and forward the service data according to a communication type of the service data, so as to implement user plane communication of the trunking UE.

The trunking call service control module 111 is configured to receive a communication request sent through the access network 120 by a UE among the trunking UEs, and perform call control and bearer management on the trunking UE according to a communication type of the communication request, so as to implement control plane communication of the trunking UE.

The access network gateway 122 may further include: a serving gateway communicating with the PDN gateway 12220, where the serving gateway and the MBMS gateway 12210 are each connected to the eNodeB123 and the MME121; the access network 120 may further include: a multi-service customer edge MCE124 connected to the MME121 and the eNodeB123 separately. The trunking management server 110 can further include: a trunking information management module and a trunking attribute management module which are connected to the trunking call service control module 111 separately (not shown in FIG. 1).

The trunking call service control module 111 may communicate with the MME121 through an SGt interface, or the trunking call service control module 111 may communicate with the MBMS gateway 12210 through an SGmb interface; the trunking call media gateway module 112 may communicate with the MBMS gateway 12210 through an SGmb-i interface; the trunking call media gateway module 112 may communicate with the PDN gateway 12220 through an SGi interface.

Optionally, the PDN gateway 12220, the MBMS gateway 12210 and the serving gateway are integrated in one network element; or the MME121 and the MCE124 are integrated in one network element; or the trunking attribute management module and the trunking call service control module are integrated in one network element.

Specifically, the trunking call media gateway module 112 may be specifically configured to: when the communication type is point-to-point communication, send, to the PDN gateway 12220, service data sent by a talker UE among the trunking UEs, where the PDN gateway 12220 forwards, through the serving gateway, the service data to an eNodeB where a called UE among the trunking UEs is located, so that the eNodeB sends the service data to the called UE; and when the communication type is point-to-multipoint communication, send, to the MBMS gateway 12210, service data sent by a talker UE among the trunking UEs, where the MBMS gateway 12210 sends the service data to an eNodeB where a monitoring UE among the trunking UEs is located, so that the eNodeB multicasts the service data to the monitoring UE.

Specifically, the trunking call service control module 111 may be specifically configured to: when the communication type is point-to-point communication, send a unicast bearer establishment request or unicast bearer release request of a UE among the trunking UEs to the PDN gateway 12220, so that the PDN gateway 12220 establishes an EPS bearer for the UE, or releases an established evolved packet system EPS bearer; and when the communication type is point-to-multipoint communication, send a trunking service initiation request of the trunking UE to the MBMS gateway 12210 through the trunking call media gateway module, where the MBMS gateway 12210 forwards the request to the MCE through the MME, so that the MCE establishes a downlink multicast bearer for the trunking service according to the request, and allocates a resource to the trunking service.

Further, the trunking information management module may be configured to manage definition, storage and update of trunking UE information and trunking subscription information, where the subscription information includes a group identifier, a group UE list, a trunking UE identity identifier, and a trunking UE priority definition; the trunking attribute management module may be configured to manage definition, storage, and update of group attribute information, where the attribute information includes a group identifier, a group priority, a group area, and a group service type.

It can be seen from the foregoing embodiment that, in the embodiment, user plane communication and control plane communication of the trunking UE can be implemented according to different communication types, so the trunking UE may be paged in a multicast manner in a trunking communication procedure, thereby improving access performance and access efficiency of the system. Correspondingly, a downlink service can be sent in a multicast manner, so occupancy on downlink channel resources in the system is also reduced.

Before the embodiment of the present invention is described in detailed below, at first, roles in trunking communication involved in the embodiment of the present invention are defined, and these roles mainly include a service UE, a calling service UE, a talker service UE and a listener service UE, where:

the service UE: it refers to any one UE in trunking communication, and if a UE subscribes to an ID of a group in the HLR, the UE becomes a service UE of the group, and the service UE may have a right for initiating and receiving a group call;

the calling service UE (briefly referred to as a calling UE or a calling): if a service UE initiates a group call, the service UE is a calling service UE of the current call, and the calling service UE may end the group call;

the talker service UE (briefly referred to as a talker UE or a talker): talker UE may talk to other UEs in a group, or upload data; before becoming a talker, the service UE needs to first send an application to a trunking management server, and if the trunking management server allows this request, the service UE becomes a talker; the talker may be converted into a listener service UE through a release request; and the listener service UE (briefly referred to as a listener UE or a listener): in a call procedure, except the talker, all service UEs joining in the group call are listener UEs, and the listener UE may only listen to voice or data, and cannot upload voice or data.

Figure 2A:
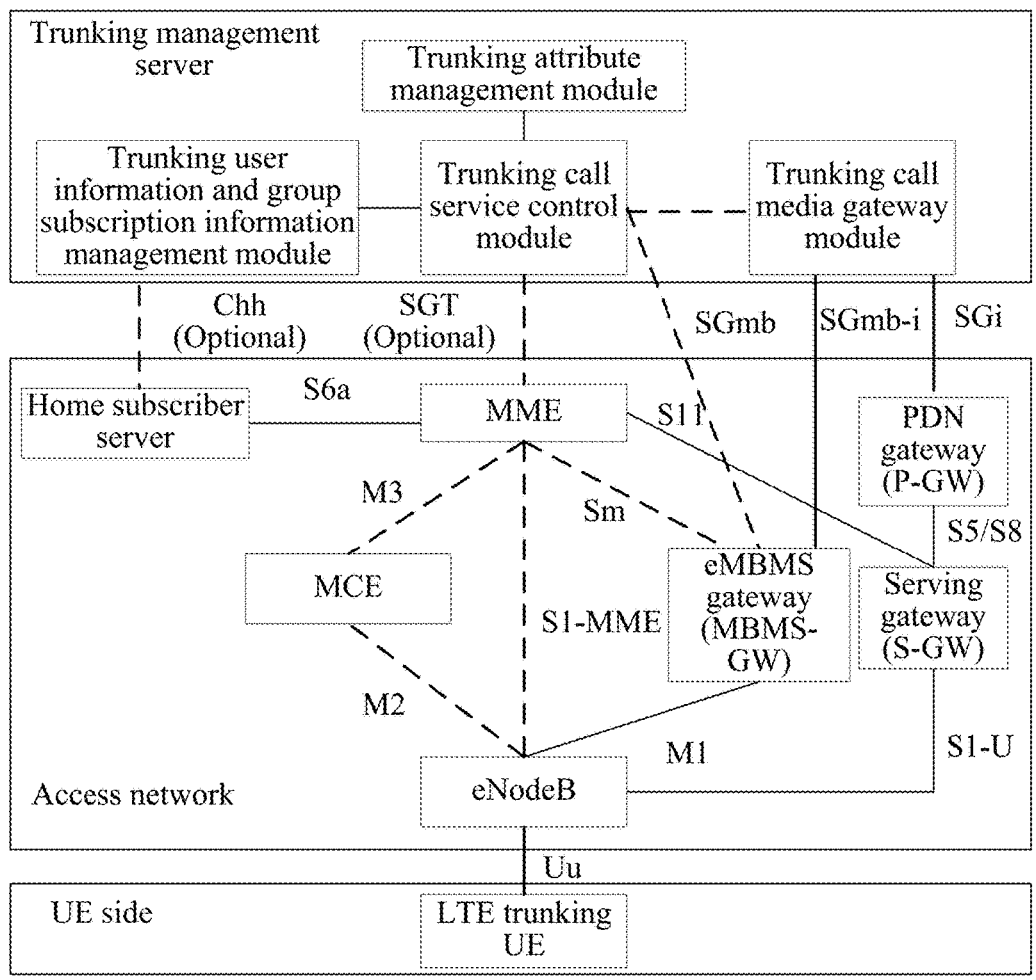
FIG. 2A is a diagram of an implementation solution of a first LTE enhanced eMBMS system architecture according to an embodiment of the present invention.

Referring to FIG. 2A, it is a schematic diagram of an LTE enhanced multimedia broadcast and multicast service (eM-BMS) system architecture to which an embodiment of a trunking communication system of the present invention is applied. The system architecture mainly includes three parts: a trunking management server, an access network and a UE side. The access network in FIG. 2 may specifically refer to an LTE access network.

In FIG. 2A, the trunking management server includes: a trunking user information and group subscription information management module, a trunking attribute management module, a trunking call service control module and a trunking call media gateway module; the access network may include: a home subscriber server, a mobile management entity (MME), a multi-service customer edge (MCE), an eNodeB, a multimedia broadcast multicast service (MBMS) gateway, a (PDN) gateway P-GW, a serving gateway S-GW and so on; the UE side mainly includes trunking UEs, and the trunking UEs include UEs belonging to a same group, and may also be referred to as group UEs, namely, the trunking and the group refer to the same meaning. In the embodiment of the present invention, a UE among the trunking UEs that obtains a talking right is referred to as a talker UE.

Figure 2B:
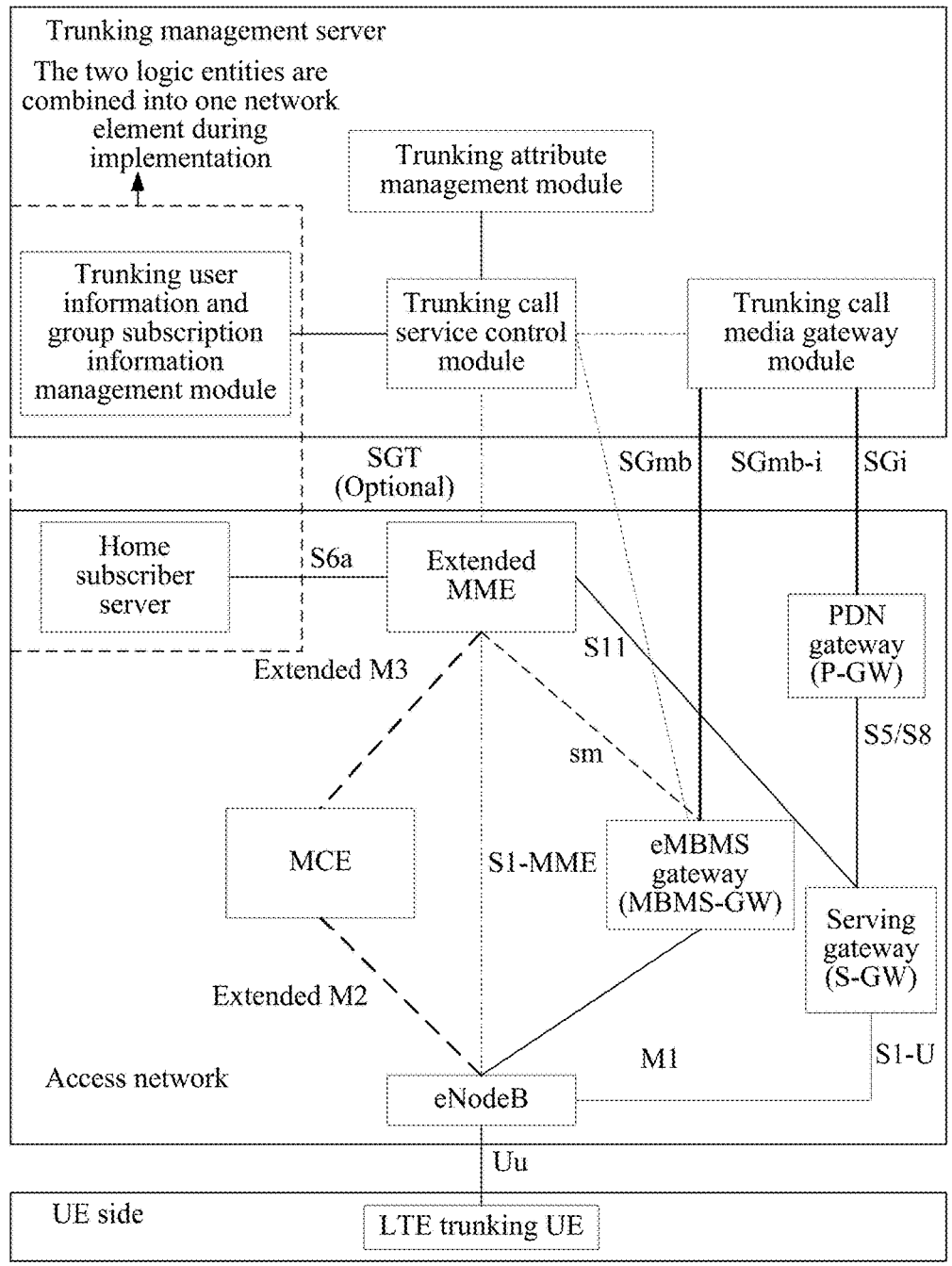
FIG. 2B is a diagram of an implementation solution of a second LTE enhanced eMBMS system architecture to which an embodiment of a trunking communication system of the present invention is applied.
Figure 2C:
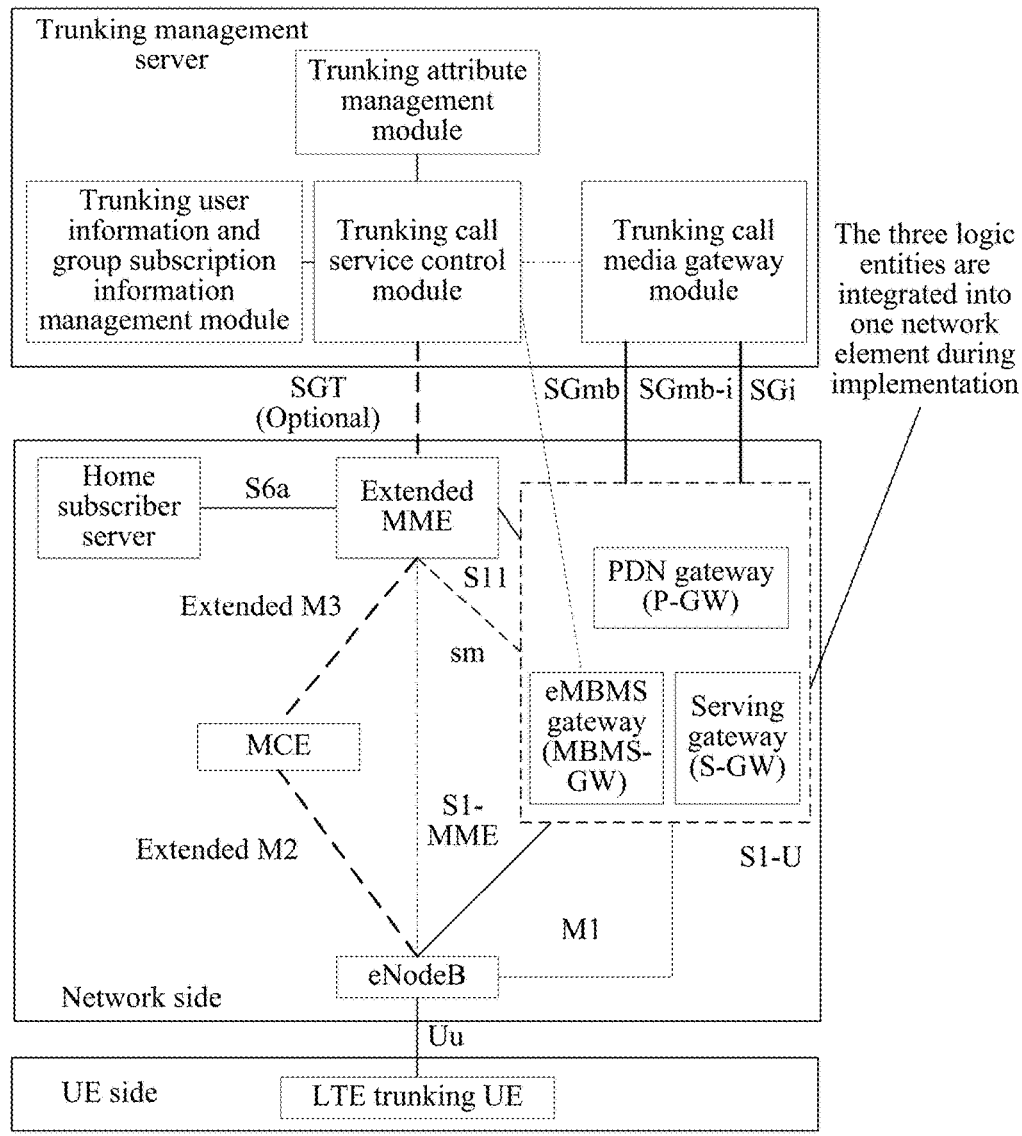
FIG. 2C is a diagram of an implementation solution of a third LTE enhanced eMBMS system architecture to which an embodiment of a trunking communication system of the present invention is applied.
Figure 2D:
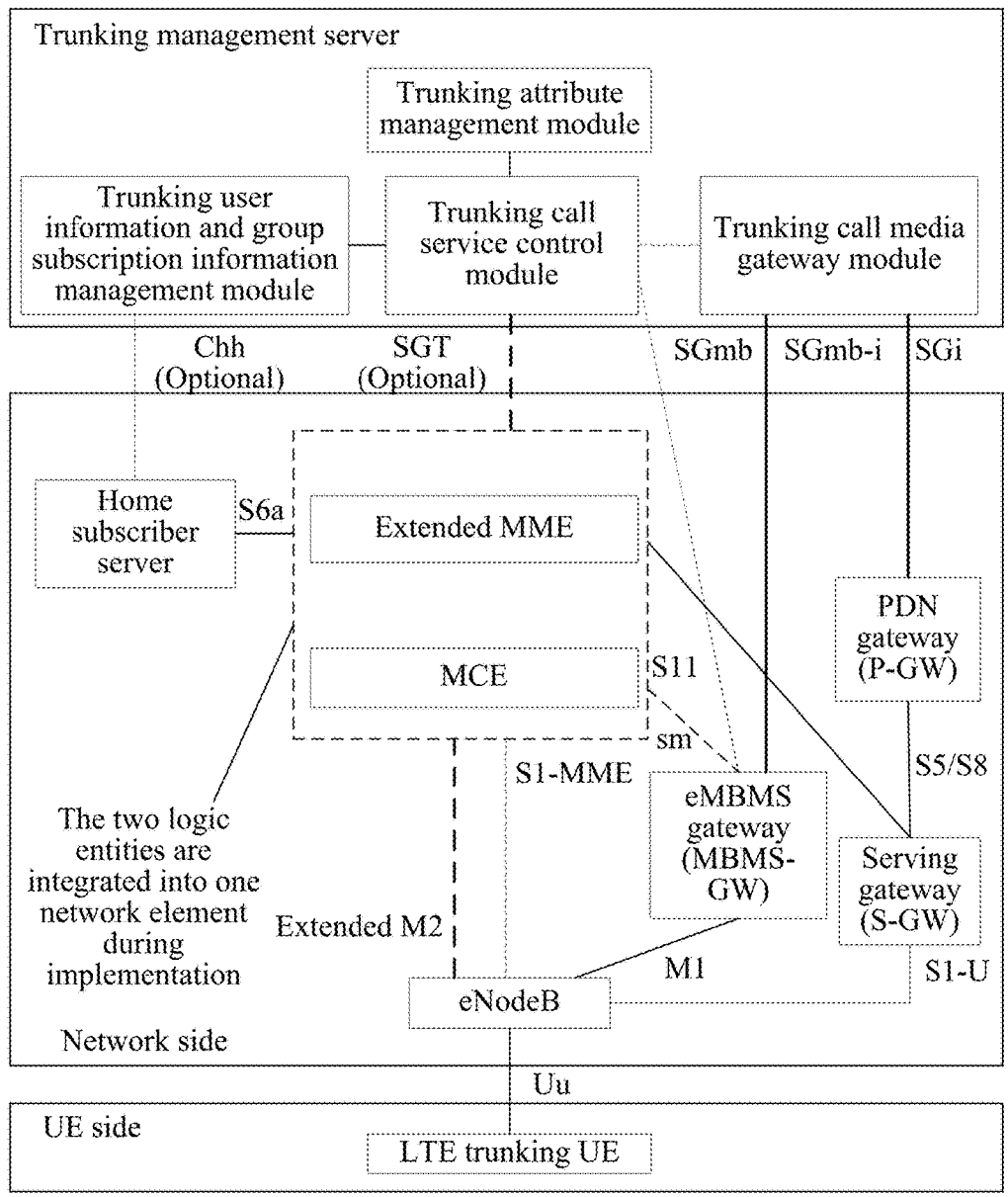
FIG. 2D is a diagram of an implementation solution of a fourth LTE enhanced eMBMS system architecture to which an embodiment of a trunking communication system of the present invention is applied.
Figure 2E:
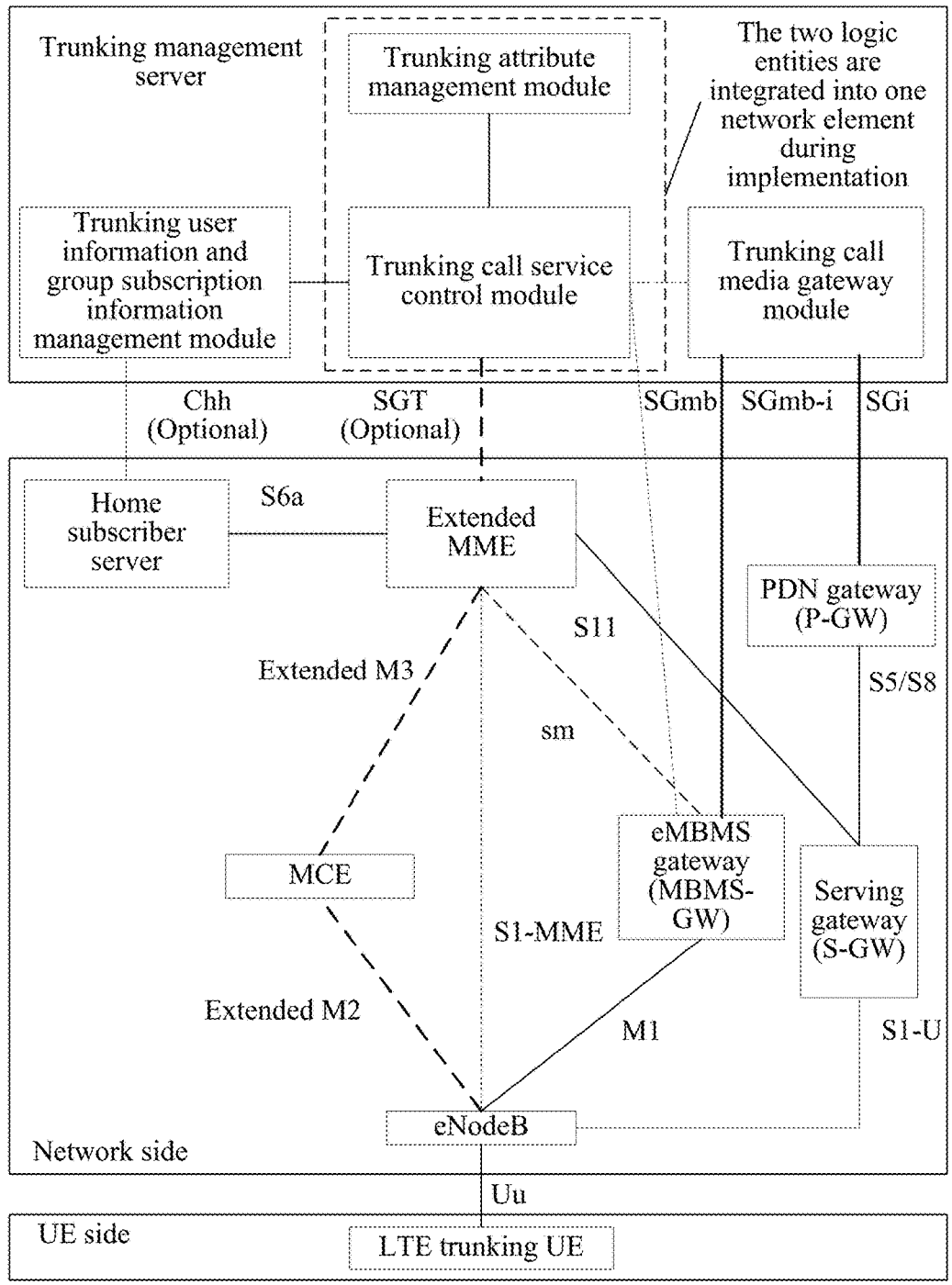
FIG. 2E is a diagram of an implementation solution of a fifth LTE enhanced eMBMS system architecture to which an embodiment of a trunking communication system of the present invention is applied.

In different application examples, the trunking user information and group subscription information management module and home subscriber server in the LTE enhanced eMBMS system may be integrated into one network element, as shown in FIG. 2B; the integrated network element may be named as a home subscriber, trunking user and group subscription information management module, the module may be connected to the trunking call service control module through a Cug interface, and be connected to the MME through an Sha interface separately, the module may be set in the trunking management server, or may also be set in the access network, and configured to share trunking user information and group subscription information, and the embodiment of the present invention imposes no limitation on this; or, the PDN gateway, the MBMS gateway, and the serving gateway may be integrated into one network element, as shown in FIG. 2C; or the MME and the MCE may be integrated into one network element, as shown in FIG. 2D; or the trunking attribute management module and the trunking call service control module may be integrated into one network element, as shown in FIG. 2E. Furthermore, the trunking attribute management module and the trunking user information and group subscription information management module in FIG. 2A can be integrated into a module, which is not shown anymore through a drawing here. It should be noted that, in the embodiment of the present invention, each module in the trunking management server and each network element of the access network may be combined flexibly according to requirements in an actual application, and the embodiment of the present invention imposes no limitation on this.

In the trunking management server:

the trunking user information and group subscription information management module is configured to manage definition, storage and update of the trunking user information and the trunking subscription information, and the managed information includes but is not limited to an identity identifier of a trunking user, priority definition, an identifier of a subscription group, a group priority, quality of service (QOS) or security information, where an identity identifier of any one trunking user managed in the trunking user information and group subscription information management module is consistent with an identity identifier of the trunking user saved by the home subscriber server in the access network, so that the access network can identify the trunking user according to the identity identifier;

the trunking attribute management module is configured to manage definition, storage, and update of a group attribute, and the managed information includes but is not limited to a group identifier, group area definition, a group type, a group service type, QOS or security information;

the trunking call service control module is configured to manage a service process of a trunking call, where the service process includes trunking call initiation, trunking call end, trunking call uplink talker floor management, call forwarding, temporary invitation of member joining, and authorized monitoring; and manage a group status and a trunking user status, where the group status may include start, end, talker being free, talker being busy, talker identity and priority, and the trunking user status includes trunking user registration, trunking user deregistration, talking or monitoring, being free or service in process; and the trunking call media gateway module is configured to forward trunking user plane data, perform bearer management between the media gateway module and the access network gateway, transparently transmit trunking application layer signaling between the trunking call service control module and the access network gateway, such as, a group call service initiation request, an uplink talker floor application, a group status update, or a security key, and support exchange of trunking service data from different networks through protocol stack conversion.

The trunking management server can implement connection with the access network through an SGt or SGmb interface set on the trunking call service control module, and an SGi interface and an SGmb-i interface set on the trunking call media gateway module. The SGt interface is a communication interface between the trunking call service control module and the MME of the access network, and is configured to transmit a network management message between an application layer of the trunking management server and the access network, such as, location information of a UE, status information of a UE in the access network, and distribution range information of a group call in the access network. It should be noted that, the SGt interface is an optional interface, and the trunking call service control module may also implement communication with the access network through the trunking call media gateway module; the SGmb-i interface is a communication interface between the trunking call media gateway module and the P-GW of the access network, and is configured to transmit user plane data or control plane data of a trunking service; the SGmb-i interface is a communication interface between the trunking call media gateway module and the MBMS gateway of the access network, and is mainly configured to transmit user plane data or control plane data of a point-to-multipoint trunking service.

In the access network:

the MME communicates with the home subscriber server, the MCE, the eNodeB, the MBMS gateway and the serving gateway separately, the MCE, the MBMS gateway and the serving gateway communicate with the eNodeB separately, and the serving gateway communicates with the PDN gateway, where the eNodeB communicates with an LTE trunking UE of the UE side. The access network in the embodiment of the present invention may be added with an MCE having a group area management function, and an MBMS gateway supporting a single-cell MBSFN area mode on the basis of a network function defined in the existing LTE standard; and simultaneously added with a group-based paging mechanism, including a group-based sending function and a group-based receiving function, on an air interface between the eNodeB and the LTE trunking terminal of the UE side; and modify part of MBMS parameters on the M2 interface, the M3 interface and the Uu interface, so as to match initiation and end of a group service, and update of a group area.

The trunking call service control module may communicate with the MME through the SGt interface; the trunking call service control module may communicate with the MBMS gateway through the SGmb interface (LTE interface), or may also directly communicate with the MBMS gateway; the trunking call service control module may communicate with the PDN gateway through the SGi interface of the trunking call media gateway module, or may also directly communicate with the PDN gateway; the trunking call media gateway module may communicate with the MBMS gateway through the SGmb-i interface (LTE interface); the trunking call media gateway module may communicate with the PDN gateway through an SGi interface.

Based on the access network, the embodiment of the present invention can implement supporting of group-based paging, and when a group service is initiated, the access network may notify a trunking user with a group as a unit that the group is to initiate a service, so that after receiving the notification, the trunking terminal can determine, according to subscription information of the trunking terminal, whether to receive the service of the group, and prepare for reception after determining that the service of the group is received; the embodiment of the present invention can further implement supporting of group-based channel sharing, and in a cell, a downlink monitoring user of a group obtains a service of the group by sharing a group channel; the embodiment of the present invention can further implement group area management, dynamically manage a group area according to a mobile location of a trunking user and an effective area self-defined by a group, and determine a corresponding cell-level range for operations such as group notification initiation, group notification end, and group resource allocation.

Figure 2F:
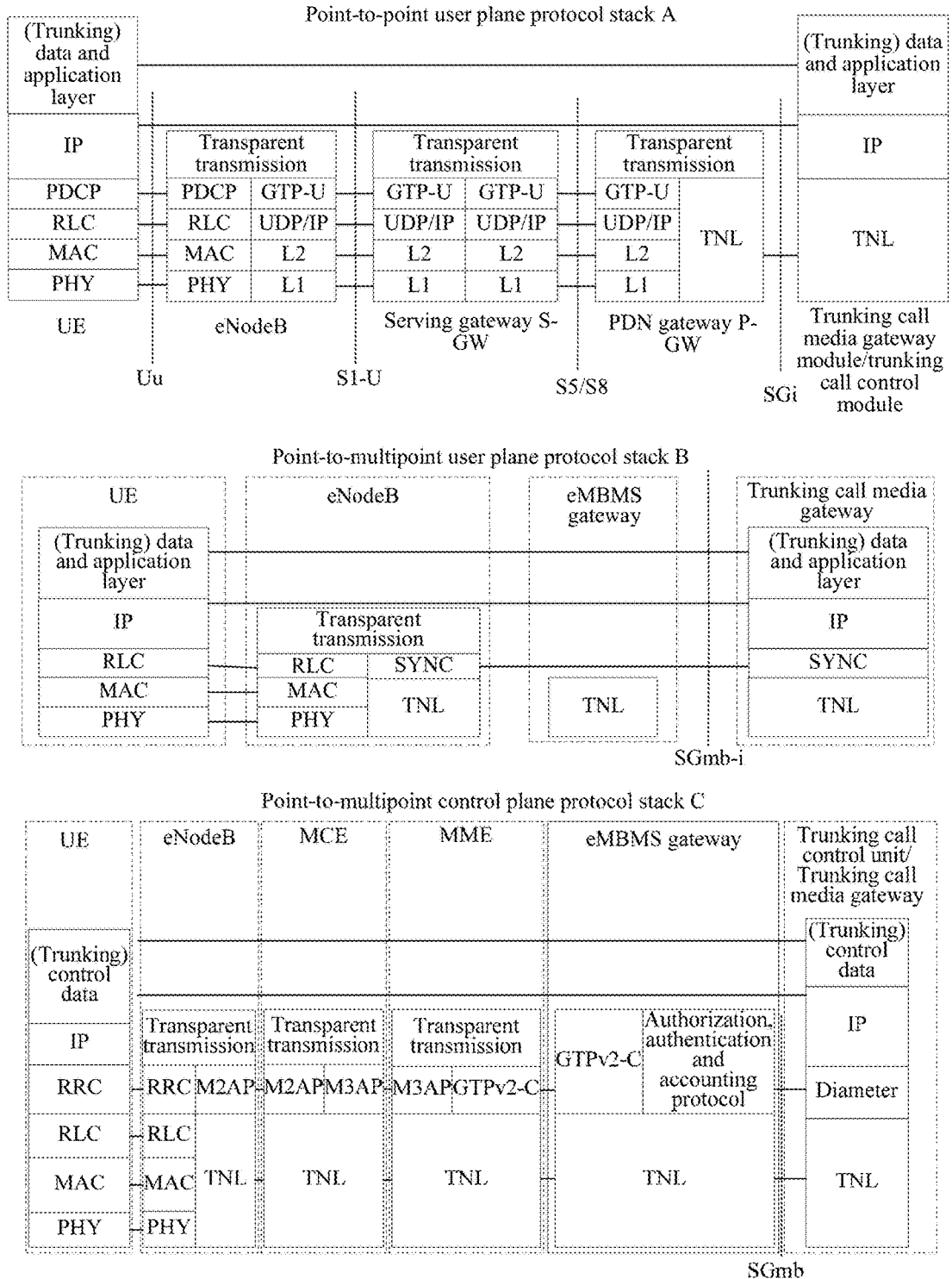
FIG. 2F is a schematic diagram of a protocol stack in an embodiment of the present invention.

Based on the LTE enhanced eMBMS system shown in FIG. 2A to FIG. 2E, communication between the trunking management server and a network element of the access network includes point-to-point communication and point-to-multipoint communication, and different types of communication are optionally implemented based on the protocol stack listed in the embodiment of the present invention. FIG. 2F is a schematic diagram of a protocol stack in an embodiment of the present invention.

FIG. 2F includes: a point-to-point protocol stack A, a point-to-multipoint user plane protocol stack B and a point-to-multipoint control plane protocol C, where transparent transmission is corresponding to Relay in English, and an authorization, authentication and accounting protocol is corresponding to Diameter in English.

When the protocol stack in FIG. 2F is applied for implementing user plane communication, for the point-to-point communication and the point-to-multipoint communication, service data transmitted by a talker UE is sent to the trunking call media gateway module based on the protocol stack A. When the trunking call media gateway module forwards data according to a communication type, if the communication type is point-to-point communication, the trunking call media gateway module sends the service data of the talker UE to the PDN gateway through, for example, the SGi interface, and then the service data is sent to a called UE based on the protocol stack A; if the communication type is point-to-multipoint communication, the trunking call media gateway module sends the service data of the talker UE to the MBMS gateway through, for example, the SGmb-i interface, then the MBMS gateway forwards, based on the protocol stack B, the service data through the M1 interface to a relevant eNodeB of a group where the talker UE is located, and the eNodeB multicasts, through the Uu interface, the service data to all monitoring UEs in the group.

When the protocol stack in FIG. 2F is applied for implementing control plane communication, no matter whether it is point-to-point communication or point-to-multipoint communication, a call initiation request, an end request, a talker floor application request, or a talker floor release request is sent by a corresponding UE in a group to the trunking call service control module based on the protocol stack A. The trunking call service control module performs call control and bearer management according to the communication type, and if the communication type is point-to-point communication, the trunking call service control module sends, through, for example, the SGi interface, a unicast bearer establishment request or unicast bearer release request of a calling UE or called UE to the access network which can be the PDN gateway, and then the PDN gateway establishes an evolved packet system (Evolved Packet System, EPS) bearer satisfying QOS of the calling UE, or releases an EPS bearer corresponding to the called UE. The trunking call service control module performs call control and bearer management according to the communication type, and if the communication type is point-to-multipoint communication, the trunking call service control module sends, through an interface such as the SGmb interface, a group service initiation request or group service end request to the MBMS gateway based on the protocol stack C, the MBMS gateway sends a control message to the MME through, for example, the Sm interface, the MME forwards the control message to the MCE through the M3 interface, the MCE establishes a downlink multicast bearer according to the control message, and allocates a resource to the group service, and meanwhile forwards it to the eNodeB through the M2 interface, and the eNodeB multicasts the downlink multicast bearer established for the group service and the resource allocated to the group service to all the UEs in the group through the Uu interface; or, the group service call control module initiates a unicast call establishment request to the called UE, the called UE initiates a unicast bearer establishment request to an EPC, the EPC replies the UE with a response after the establishment is completed, and the UE returns unicast called bearer establishment completion to a PTT Server after receiving the response.

Further, in the system architecture shown in FIG. 2A to FIG. 2E, for the system architecture in which the trunking user information and group subscription information management module, and the home subscriber server are individually set, the Chh interface may be further set to connect the trunking user information and group subscription information management module, and the home subscriber server. When the trunking user information and group subscription information management module, and the home subscriber server are connected for the first time, or after updating trunking user information and group subscription information, the trunking user and group subscription information management module notifies the home subscriber server that the home subscriber server can obtain a mapping between a group identifier in the trunking user information and group subscription information management module and a corresponding trunking user identity identifier through the Chh interface, so that the home subscriber server internally establishes a mapping between a group identifier and a group user identifier (such as, an IMIS), or an IP of a group user in the access network, where update of the trunking user information and the group subscription information includes but is not limited to addition or deletion of a group member in an existing group, and new addition of a group and a group member thereof. Correspondingly, after obtaining group ID information from the Sm interface or the SGt interface, the MME may also obtain information such as a UE ID (such as, an IMIS) or a UE IP corresponding to a group user from the home subscriber server. By setting the Chh interface between the trunking user information and group subscription information management module, and the home subscriber server, signaling interaction of the control plane can be reduced, thereby reducing group establishment latency and group communication user plane latency.

Figure 2G:
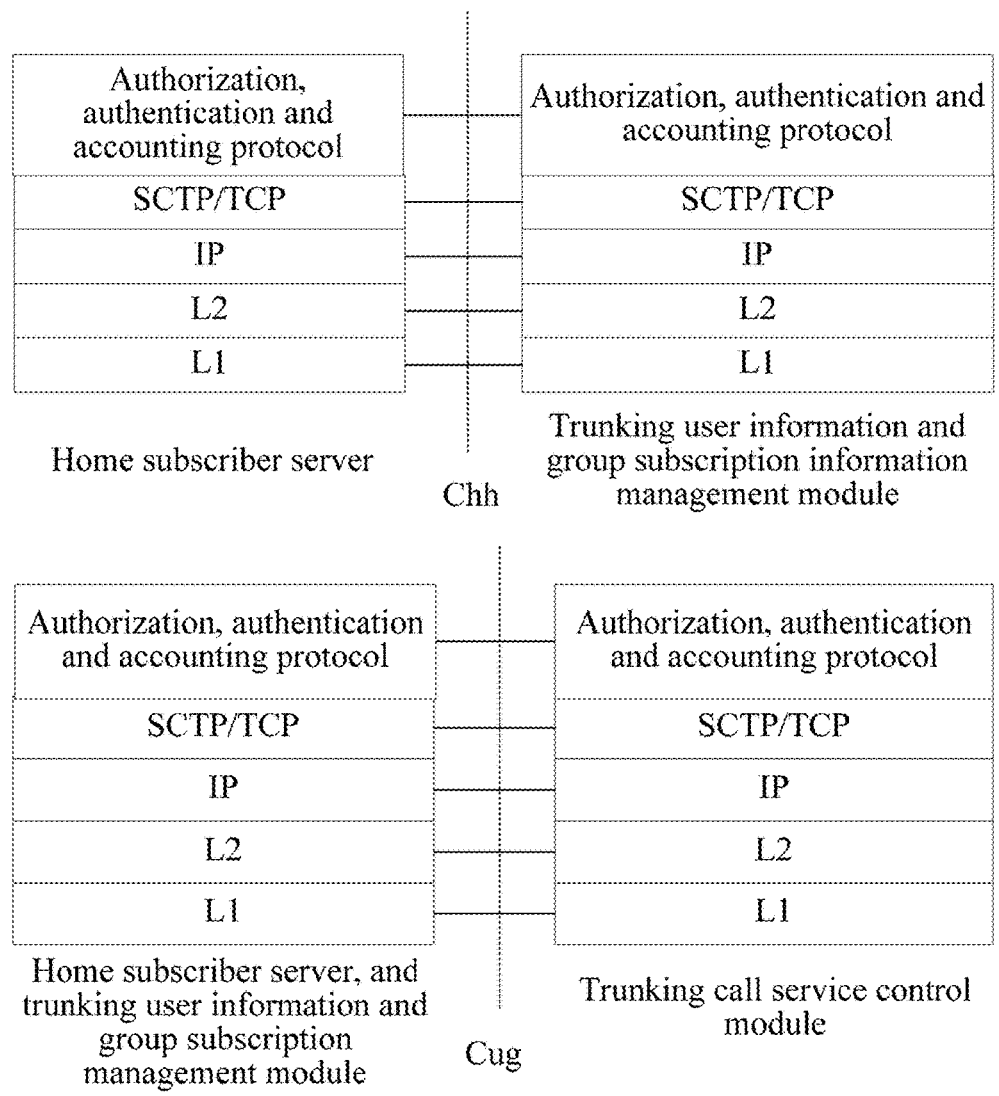
FIG. 2G is a schematic diagram of a protocol stack supplementary to FIG. 2F.

Referring to FIG. 2G, it is a schematic diagram of a protocol stack supplementary to FIG. 2F, which includes a protocol stack between the home subscriber server and the trunking user and group subscription information management module, and a protocol stack between the home subscriber server, the trunking user and group subscription information management module and the trunking call service control module.

Figure 3:
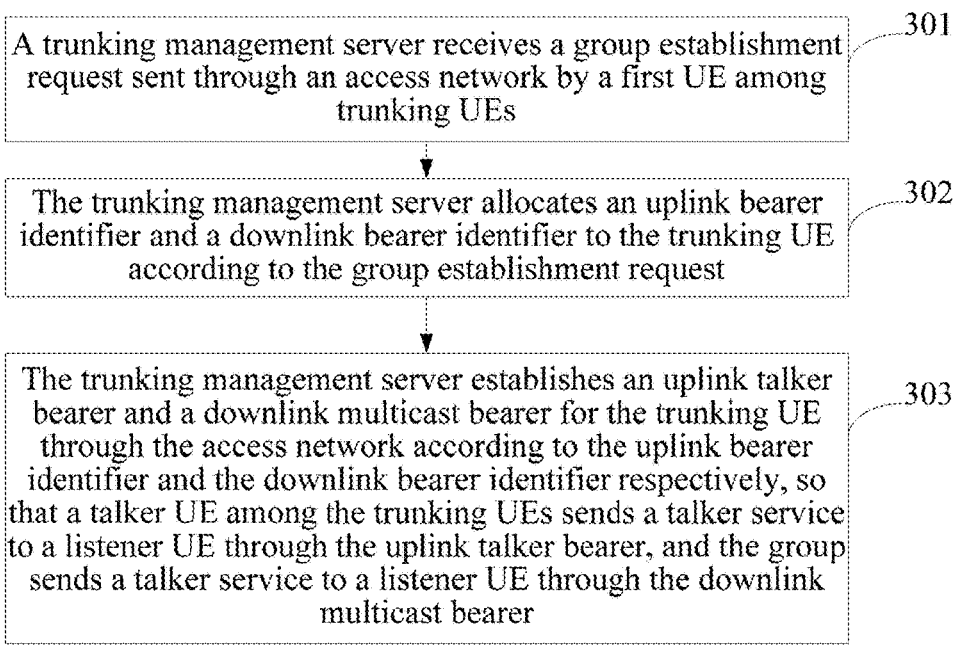
FIG. 3 is a flow chart of a first embodiment of a trunking communication method according to the present invention.

Referring to FIG. 3, it is a flow chart of an embodiment of a trunking communication method of the present invention, and the trunking communication method can be applied to the trunking communication system in FIG. 1.

Step 301: A trunking management server receives a group establishment request sent through an access network by a first UE among trunking UEs.

The first UE in this embodiment is the calling service UE defined above.

Step 302: The trunking management server allocates an uplink bearer identifier and a downlink bearer identifier to the trunking UE according to the group establishment request.

Step 303: The trunking management server establishes an uplink talker bearer and a downlink multicast bearer for the trunking UE through the access network according to the uplink bearer identifier and the downlink bearer identifier respectively, so that a talker UE among the trunking UEs sends a talker service to a listener UE through the uplink talker bearer and the downlink multicast bearer.

Specifically, the trunking management server sends an uplink talker bearer establishment request message containing an uplink bearer identifier to the access network, so that the access network allocates the uplink talker bearer identifier to the talker UE among the group UEs according to the uplink talker bearer establishment request message, establishes an uplink talker unicast bearer, and establishes a mapping between the talker unicast bearer and the uplink talker bearer identifier.

Specifically, the trunking management server sends a group call start request message to the access network, so that the access network allocates a downlink bearer identifier and an Internet protocol IP multicast address to the group according to the group call start request message, and binds the IP multicast address and the downlink bearer identifier; and the access network sends a group session start request message to a base station where the group UE is located, so that the base station sends a group-based paging notification message to all UEs of the group according to the group session start request message; and sends a group resource scheduling message to an eNodeB where the group UE is located, so that the eNodeB joins in a multicast group corresponding to the IP multicast address, and sends a group resource update notification message to the group UE according to the group resource scheduling message.

Further, the method may further include: receiving, by the trunking management server, a group end request message sent by the first UE among the trunking UEs; releasing, by the trunking management server according to the group end request message, the uplink bearer identifier and the downlink bearer identifier allocated to the trunking UE; and sending, by the trunking management server, a group call end request message to the access network, so that the access network releases the uplink talker bearer and the downlink multicast bearer established for the trunking UE.

Further, the method may further include: receiving, by the trunking management server, an uplink floor application request message sent by a talker UE among the trunking UEs, and allocating an uplink bearer identifier to the talker UE according to the uplink floor application request message; sending, by the trunking management server, a group status update message to the access network, where the group status update message includes a group identifier of the trunking UEs, an identifier of the talker UE, talker identity information of the talker UE, and a busy status of the talker UE, so that an eNodeB of the access network multicasts the group status update message to the trunking UE; and sending, by the trunking management server, a talker bearer establishment request message to the access network, where the talker bearer establishment request message includes the uplink bearer identifier, the group identifier of the trunking UEs, the identifier of the talker UE, and the talker identity information of the talker UE, so that the access network establishes an EPS bearer for the talker UE.

Further, the method may further include: receiving, by the trunking management server, an uplink floor release request message sent by the talker UE, and releasing, according to the uplink floor release request message, the uplink bearer identifier allocated to the talker UE; sending, by the trunking management server, a group status update message to the access network, where the group status update message includes a group identifier of the trunking UEs, an identifier of the talker UE, talker identity information of the talker UE, and a free talker status of the talker UE, so that an eNodeB of the access network multicasts the group status update message to the trunking UE; and sending, by the trunking management server, a talker bearer release request message to the access network, where the talker bearer release request message includes the uplink bearer identifier, the group identifier of the trunking UEs, the identifier of the talker UE, and the talker identity information of the talker UE, so that the access network releases the EPS bearer established for the talker UE.

Further, the method may further include: receiving, by the trunking management server, a trunking user registration request message sent through the access network by the trunking UE, and returning a trunking user registration request response message containing an IP address of the trunking management server to the access network, so that the access network forwards the trunking user registration request response message to the trunking UE.

Further, the method may further include: receiving, by the trunking management server, a trunking user registration request message sent by the trunking UE according to the IP address of the trunking management server, or receiving, by the trunking management server, a trunking user registration request message sent by the trunking UE according to the identifier of the trunking management server, and returning a trunking user registration request response message to the trunking UE.

It can be seen from the foregoing embodiment that, in this embodiment, user plane communication and control plane communication of the trunking UE may be implemented according to different communication types, so the trunking UE can be paged in a multicast manner in a trunking communication procedure, thereby improving access performance and access efficiency of the system. Correspondingly, a downlink service can be sent in a multicast manner, so occupancy on downlink channel resources in the system is also reduced.

An embodiment of the trunking communication method of the present invention is described in detail below in combination with the system architecture and the protocol stack shown in FIG. 2A to FIG. 2F.

Figures 1, 4A:
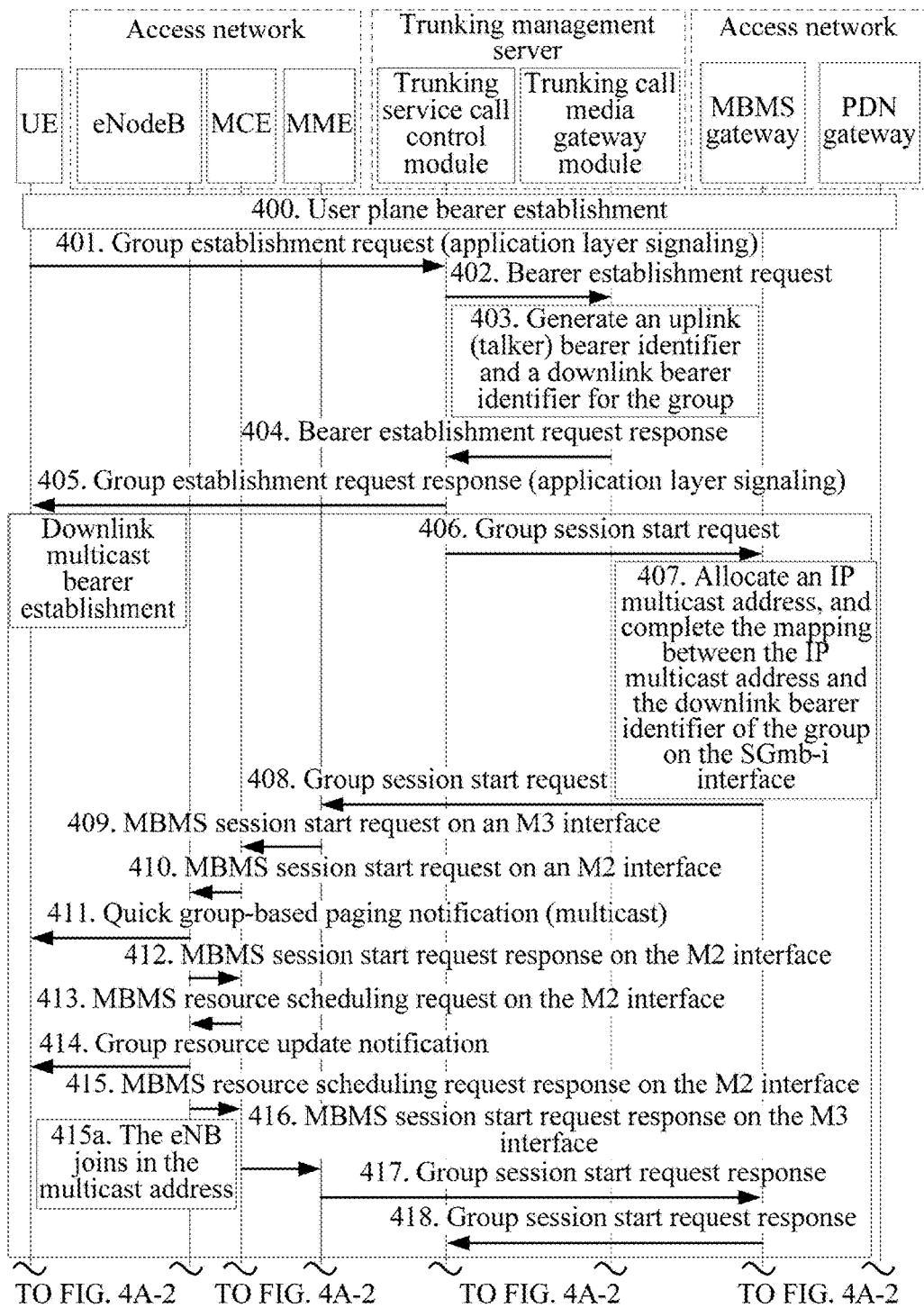
Figures 2, 4A:
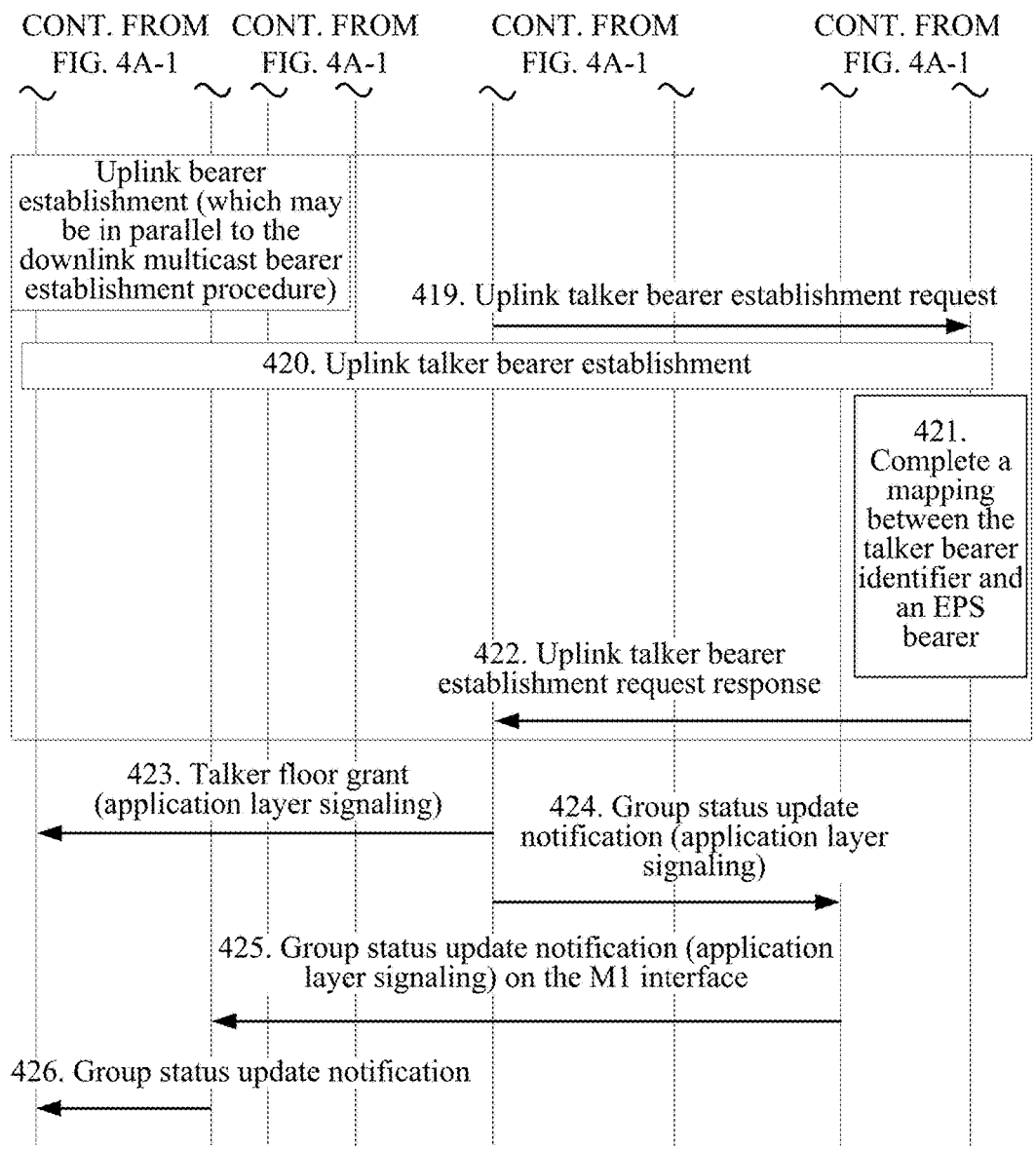

Referring to FIG. 4A-1 and FIG. 4A-2, they are a flow chart of a second embodiment of a trunking communication method of the present invention, and this embodiment describes a group establishment procedure during trunking communication, where a trunking calling UE may be any one UE in a group.

Step 400: A trunking UE in a group enters a radio resource control (Radio Resource Control, RRC) connection status, establishes an evolved packet system (Evolved Packet System, EPS) bearer between the trunking UE and a PDN gateway, and meanwhile enables a protocol stack A.

Step 401: A trunking calling UE sends, based on a protocol stack A, a group establishment request message based on an application layer to a trunking call service control module, where the group establishment request message can include a group identifier, a calling identity, a group call type, and a service identifier.

Step 402: The trunking call service control module sends a group bearer establishment request message to a trunking call media gateway module, where the group bearer establishment request message is used to request allocating a corresponding uplink bearer identifier and a corresponding downlink bearer identifier to the group.

Step 403: The trunking call media gateway module allocates resources such as the uplink bearer identifier and the downlink bearer identifier to the group.

Step 404: The trunking call media gateway module sends a group bearer establishment request response message to the trunking call service control module, where the group bearer establishment request response message carries the uplink bearer identifier and the downlink bearer identifier which are allocated. The uplink bearer identifier and the downlink bearer identifier are used to identify, when the trunking call media gateway module subsequently exchanges user plane data with the PDN gateway and the MBMS gateway, a group to which the exchanged data belongs. For example, if the uplink bearer identifier allocated by the trunking call media gateway module to the group 1 is 10, and the downlink bearer identifier allocated by the trunking call media gateway module to the group 1 is 20, the trunking call media gateway module exchanges data on the uplink bearer with the identifier being 10 to the downlink bearer with the identifier being 20, thereby implementing that data sent by the talker UE in the group 1 on the uplink bearer 10 can be forwarded to other UEs in the group 1 through the downlink bearer 20.

Step 405: The trunking call service control module confirms, by querying a trunking attribute management module, whether the group establishment request message is valid, and sends, when being valid, a group establishment request response message based on an application layer to the trunking UE, where the group establishment request response message can include information such as a group identifier, a group member list, a group call type, and a service identifier, so as to denote that the message is already handled. In addition, if the group establishment request message is invalid, the trunking call service control module may not respond to the group establishment request message, and stop a subsequent operation.

Step 406 to step 418: Establish a downlink multicast bearer for a UE in the group.

Step 406: The trunking call service control module sends a group call start request message to the MBMS gateway through the SGmb-i interface of the trunking call media gateway module, where the group call start request message carries the downlink bearer identifier allocated by the trunking call media gateway module to the group, and a parameter such as a group identifier, and QOS.

Step 407: The MBMS gateway allocates an IP multicast address to the group, and maps the IP multicast address and the downlink bearer identifier of the group on the SGmb-i interface, so that subsequently the trunking call media gateway module may transmit a downlink group service to a cell corresponding to the IP multicast address according to the mapping.

Step 408: The MBMS gateway sends a group session start request message (serving as an MBMS Service Session) to the MME through the Sm interface, where the group session start request message may carry information such as a group identifier (which can be, for example, a TMGI), a group member list, group area definition, and QOS.

Step 409: The MME sends an MBMS session start request message to an MCE through the M3 interface according to the group session start request message, where the MBMS session start request message may carry information such as a group identifier, an initial area of group service initiation, and QOS.

Step 410: The MCE forwards an MBMS session start request message to an eNodeB through the M2 interface.

Step 411: The eNodeB that receives the MBMS session start request message sends a group-based paging notification message to a UE of the group through the Uu interface, so that the UE in the group prepares to receive group service data after receiving the group-based paging notification message, including establishment of a bearer link and initialization of an application layer configuration with an access network.

Step 412: The eNodeB that receives the MBMS session start request message sends an MBMS session start request response message to the MCE through the M2 interface.

Step 413: The MCE sends an MBMS gateway resource scheduling message to the eNodeB through the M2 interface according to the initial area where the group service is initiated, and allocates a corresponding radio resource to the group downlink service.

Step 414: The eNodeB that receives the MBMS gateway resource scheduling message updates an MBMS resource indication channel on an air interface according to the resource scheduling message, and sends a group resource update notification message to the UE in the group, where the group resource update notification message includes resource information of a group downlink traffic channel.

Step 415: The eNodeB that receives the MBMS gateway resource scheduling message sends an MBMS gateway resource scheduling response message to the MCE through the M2 interface.

Step 415a: In synchronization with step 315, the eNodeB that receives the MBMS gateway resource scheduling message joins in the IP multicast address of the group.

Step 416: After receiving the MBMS gateway resource scheduling response message, the MCE sends an MBMS session start request response message to the MME through the M3 interface.

Step 417: The MME sends a group session start request response message to the MBMS gateway.

Step 418: The MBMS gateway sends a group session start request response message to the trunking call service control module.

Step 419 to step 422: Establish an uplink bearer for a talker UE in the group, and the step 419 to step 422 may be executed in synchronization with the foregoing step 406 to step 418.

Step 419: The trunking call service control module sends an uplink talker bearer establishment request message to the access network, such as a PDW gateway through the SGi interface of the trunking call media gateway module, where the message carries an uplink talker UE bearer identifier, a group identifier, a talker UE identifier, and a QOS parameter allocated by the trunking call media gateway module to the talker UE in the group.

Step 420: The access network, such as a PDW gateway, establishes an uplink talker unicast bearer for the talker UE in the group according to the uplink talker bearer establishment request message, where the uplink talker unicast bearer is a unicast bearer capable of satisfying a service QOS requirement of the talker UE.

In this embodiment, the uplink talker UE may be the calling UE in step 401.

Step 421: The PDN gateway establishes a mapping between the uplink talker unicast bearer and a talker bearer identifier of the group on the SGi interface.

Step 422: The PDW gateway sends an uplink talker bearer establishment request response message to the trunking call service control module.

Step 423: After the LTE access network completes establishment of the uplink bearer and the downlink bearer of the group, the trunking call service control module can send a talker floor grant message based on the protocol stack A or based on the point-to-multipoint protocol stack B through the SGi interface, such as, send the talker floor grant message to a calling UE in the group, and the UE receiving the talker floor grant message may start sending talker service data as the talker UE in the group.

Delivery of the talker floor grant message is one of necessary conditions for successfully initiating a group service. For example, the calling UE as a talker UE may start an applied group service, such as a voice call after receiving the talker floor grant message. At this time, for uplink unicast communication, group service data of the talker UE is sent to the trunking call media gateway module according to the protocol stack A; for downlink multicast communication, the trunking call media gateway module sends the multicast data to the MBMS gateway through the SGmb-i interface, the MBMS-GW sends, according to the protocol stack B, the multicast data to an eNodeB where other UEs in the group are located, and the eNodeB sends the multicast data to other UEs of the group in a channel shared manner according to an LTE eMBMS mechanism on an air interface; generally a service of a group can be regarded as an MBMS session.

Step 424: The trunking call service control module sends a group status update notification message based on an application layer to the MBMS gateway, where the group status update notification message includes an identifier of a talker UE, and a priority of a talker UE.

Step 425: The MBMS gateway sends the group status update notification message to the eNodeB through the M1 interface.

Step 426: The eNodeB forwards the group status update notification message to other UEs in the trunking.

It should be noted that, in the embodiment shown in FIG. 4A-1 and FIG. 4A-2, step 419 and step 403 can be executed in parallel, and step 423 and step 403 can also be executed in parallel; step 423 can be directly executed after step 418; step 418 can be executed in advance after step 406; step 406 and step 419 can be executed in parallel, and the flow chart shown in FIG. 4A-1 and FIG. 4A-2 imposes no limitation on this.

Furthermore, at the same time of initiating step 401, the UE can also initiate talker bearer establishment to the PDN gateway of the access network, so as to replace step 419 to step 422 (a dedicated bearer established from the UE side). Specifically, step 420 in FIG. 4A-1 and FIG. 4A-2 may be first executed, and the name of the transmitted message is modified into the UE initiation uplink talker bearer establishment and bearer establishment completion message; then step 419 is executed, and the name of the transmitted message is modified into the talker bearer identifier and uplink talker bearer mapping request message; finally, step 422 is executed, the name of the transmitted message is modified into the talker bearer identifier and uplink talker bearer mapping response message.

Furthermore, different from that in FIG. 4A-1 and FIG. 4A-2, the trunking management server initiates uplink bearer establishment (step 419 to step 422), in an optional embodiment, the trunking UE may initiate, at the same time of executing step 401: sending a group establishment request, an uplink talker bearer establishment request to the access network, and completes uplink talker bearer establishment of the trunking UE through interaction with the eNB, the MME and the PDN gateway of the access network.

In this embodiment, when a group downlink service is implemented, a group service may be regarded as an MBMS session based on an existing LTE MBMS mechanism, and the LTE access network allocates a corresponding temporary mobile group identity (TMGI) and a corresponding logic channel identifier to the MBMS Session. Generally a launch area of a group service is usually decided by the actual location of the group UE, namely, a set of cells where UEs of the group are located forms the launch area of the group service; or, a valid area of the group may also be predefined, and the valid area is used as a group attribute.

Figure 4B:
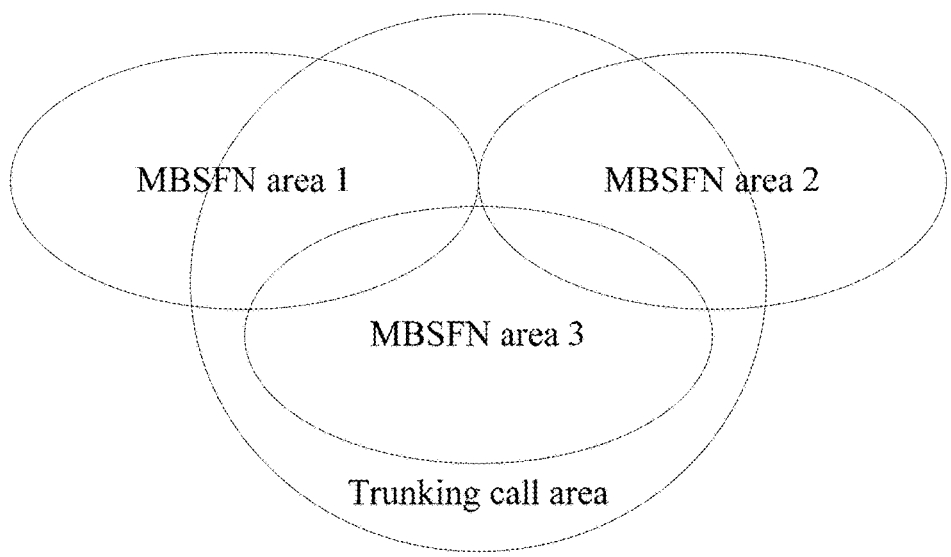
FIG. 4B is a schematic diagram of launching of an MBMS session in an existing trunking communication system.

A schematic diagram of launch of an existing MBMS session is shown in FIG. 4B, and a group service launch area may be formed of several MBSFN areas, where services of the same group may be mapped into different MBMS over the single frequency network (MBSFN) areas (areas); in the same MBSFN area, services of the same group are regarded as an MBMS Session, which is borne on an MBMS point-to-multipoint traffic channel (MTCH) in the MBSFN area, and each MTCH bears services from the same group. In FIG. 4B, a part of the MBSFN area1, and a part of the MBSFN area2 fall out of the launch area required for a group service, and according to the existing LTE eMBMS mechanism, actually services of the group are also launched on these areas, so network resources are wasted.

Figure 4C:
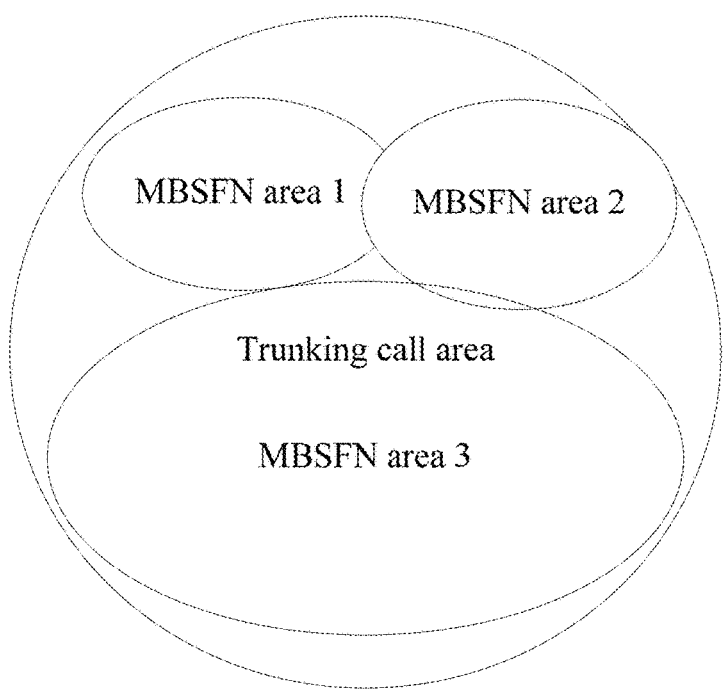
FIG. 4C is a schematic diagram of launching of an MBMS session according to an embodiment of the present invention.

In the embodiment of the present invention, the foregoing defect can be overcome in a manner of shrinking the MBSFN area. FIG. 4C is a schematic diagram of launching of an MBMS session in an embodiment of the present invention. One launch manner can be: only one cell exists in each MBSFN area, and the MBSFN sub-frame design in the original MBSFN area multi-cell mode is still reused, namely, the long cyclic prefix CP, the MBSFN pilot, and the MBSFN area-specific scrambling are still used in an MBSFN sub-frame; the other launch manner can be: only one cell exists in each MBSFN area; at this time, the CP length and the CRS pilot (including the format of CRS pilot signal generation and CRS pilot distribution, and the number of CRS pilots) adopted by the cell non-MBSFN sub-frame are adopted in an MBSFN sub-frame, and the single-antenna port (single-antenna port) or transmit diversity mode is supported according to the number of CRS pilots.

For the MBMS Session single-cell mode shown in FIG. 4C, an identifier (such as, 1 bit) can be added into a system information block (SIB) 13, so as to indicate whether a given MBSFN area is in an MBMS multi-cell mode or in a single-cell mode.

Figure 5:
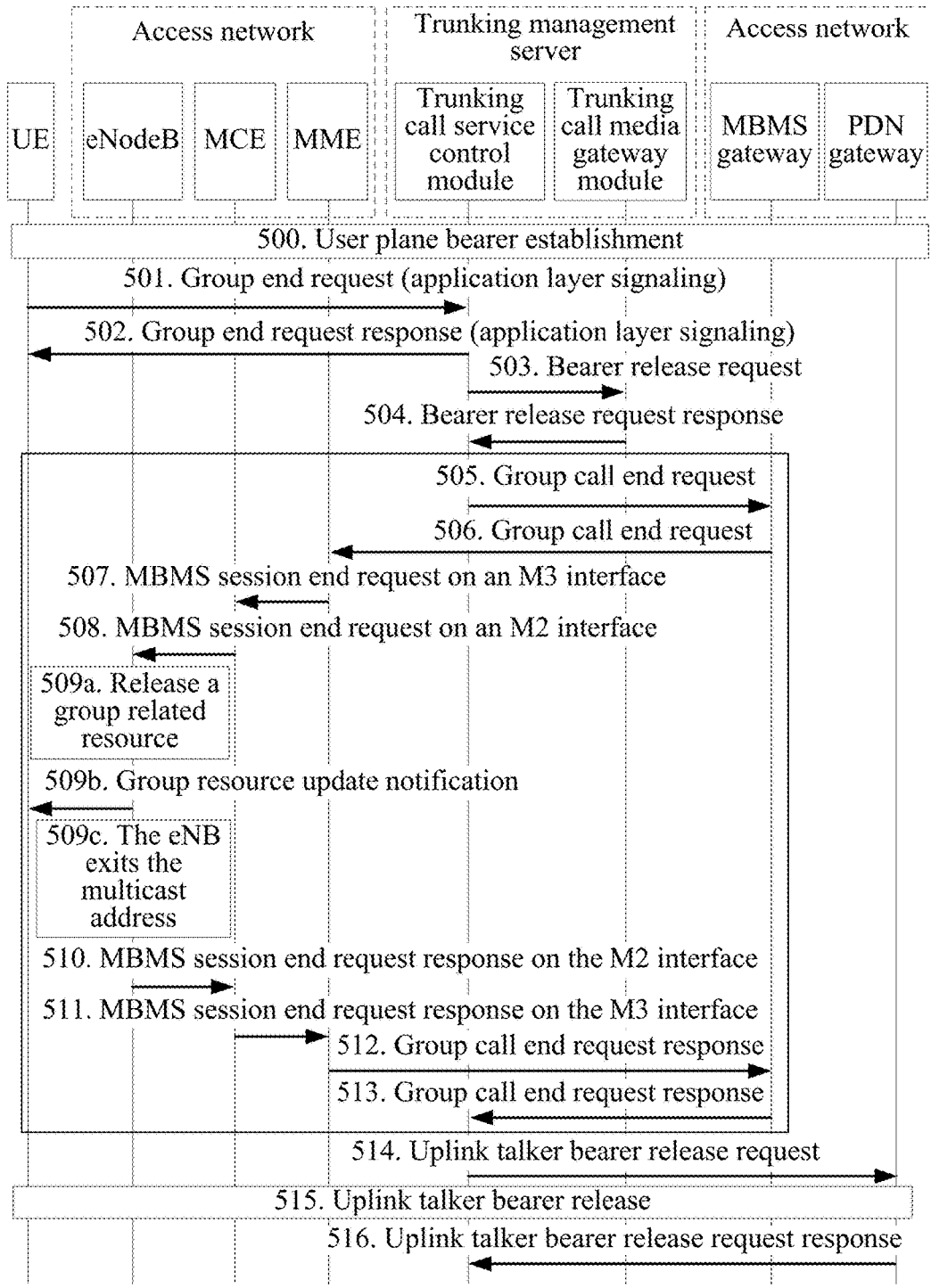
FIG. 5 is a flow chart of a third embodiment of a trunking communication method according to the present invention.

Referring to FIG. 5, it is a flow chart of a third embodiment of a trunking communication method according to the present invention, and this embodiment describes a group end procedure during trunking communication.

Step 500: A calling UE in a group enters an RRC connection status, establishes an EPS bearer between the calling UE and a P-GW, and meanwhile enables a protocol stack A.

Step 501: The calling UE sends a group end request message to a trunking call service control module based on the protocol stack A, where the group end request message includes a group identifier, and a service identifier.

Step 502: The trunking call service control module confirms whether the group end request message is valid, and if valid, sends a group end request response message to the calling UE, where the group end request response message includes information such as a group identifier, a group call type, and a service identifier, denoting that the message is already handled; or otherwise, does not respond to the group end request response message, and stops a subsequent operation.

Step 503: The trunking call service control module sends a group bearer release request message to a trunking call media gateway module, where the group bearer establishment request message is used to request releasing an uplink bearer identifier and a downlink bearer identifier allocated to the group.

Step 504: The trunking call media gateway module sends a group bearer release request response message to the trunking call service control module.

Step 505 to step 513: Release a downlink multicast bearer for a UE in the group.

Step 505: The trunking call service control module sends a group call end request message to an MBMS gateway through an SGmb interface.

Step 506: The MBMS gateway forwards a group call end request message to an MME.

Step 507: The MME sends an MBMS session end request message to the MCE through an M3 interface.

Step 508: The MCE forwards the MBMS session end request message to an eNodeB through an M2 interface.

Step 509a: The eNodeB releases a group resource according to the MBMS session end request message.

Step 509b: The eNodeB sends a group resource update notification message to the UE in the group.

Step 509c: The eNodeB exits the multicast IP address of the group.

Step 510: The eNodeB returns an MBMS session end request response message to the MCE through the M2 interface.

Step 511: The MCE forwards the MBMS session end request response message to the MME through the M3 interface.

Step 512: The MME returns a group call end request response message to the MBMS gateway.

Step 513: The MBMS gateway forwards the group call end request response message to the trunking call service control module.

Step 514: The trunking call service control module sends an uplink talker bearer release request message to the PDW gateway through an SGi interface.

Step 515: The PDN gateway releases, according to the uplink talker bearer release request message, an uplink talker unicast bearer established for the talker UE in the group.

Step 516: The PDW gateway returns an uplink talker bearer release request response message to the trunking call service control module.

Figure 6:
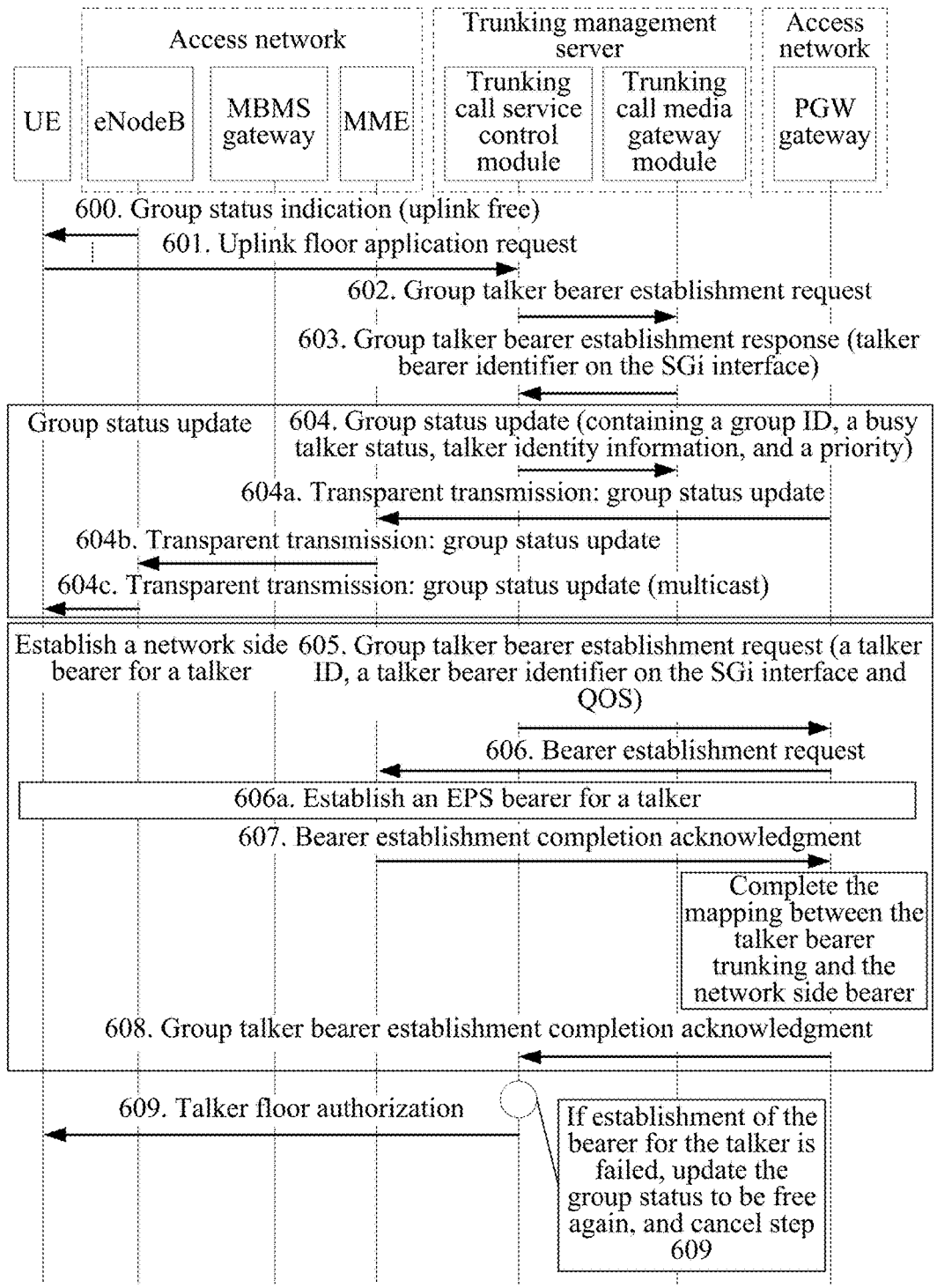
FIG. 6 is a flow chart of a fourth embodiment of a trunking communication method according to the present invention.

FIG. 6 is a flow chart of a fourth embodiment of a trunking communication method according to the present invention, and this embodiment describes a procedure that a trunking UE in a group applies for an uplink talker floor after the group is established during trunking communication.

Step 600: By sending a group status indication message to the trunking UE, an eNodeB notifies a trunking UE that the trunking UE is currently in an uplink free status.

Step 601: The trunking UE sends an uplink floor application request message based on an application layer to a trunking call service control module based on the protocol stack A, where the uplink floor application request message includes a group identifier, identity information (such as, a UE identifier) of the trunking UE as a calling UE, a group call type, and a service identifier.

Step 602: The trunking call service control module confirms, by querying a trunking user information and group subscription information management module, whether the uplink floor application request message is valid, and if valid, sends a group talker bearer establishment request message to a trunking call media gateway module, where the group talker bearer establishment request message is used to request allocating a corresponding uplink bearer identifier to a talker UE.

Step 603: The trunking call media gateway module returns a group talker bearer establishment response message to the trunking call service control module, where the group talker bearer establishment response message contains the uplink bearer identifier allocated to the group during group establishment.

Step 604: The trunking call service control module sends a group status update message to the trunking call media gateway module, where the group status update message contains a group identifier, a busy talker status, talker identity information, and a talker priority.

Step 604a: The trunking call media gateway module transparently transmits the group status update message to an MBMS gateway.

Step 604b: The MBMS gateway transparently transmits the group status update message to the eNodeB.

Step 604c: The eNodeB multicasts the group status update message to a UE in the group, so that the UE in the group stops application for the talker floor after receiving the message when the priority of a UE is not higher than the priority of the trunking UE with the current application talker floor.

Step 605: The trunking call service control module sends a talker bearer establishment request message to a PDN gateway, where the talker bearer establishment request message contains an uplink bearer identifier, a group identifier, a talker identifier, and a QOS parameter.

Step 606: The PDN gateway forwards a talker bearer establishment request message to an MME.

Step 606a: The MME establishes an EPS bearer for a trunking UE as a talker UE.

Step 607: The MME returns a talker bearer establishment completion message to the PDN gateway, so that the PDN gateway completes the mapping between the talker bearer trunking and the EPS bearer.

Step 608: The PDN gateway sends the talker bearer establishment completion message to the trunking call service control module.

Step 609: The trunking call service control module sends a talker floor authorized message to the talker UE in the group based on the protocol stack A through the SGi interface, so that talker UE initiates a talker service after receiving the message.

It should be noted that, the step 602 and step 605 may be executed in parallel; at the same time of executing step 601, the UE may initiate talker bearer establishment to the PDN gateway of the access network, so as to replace step 606 to step 607 (a dedicated bearer established from the UE side). Specifically, step 606a in FIG. 6 may be first executed, and the name of the message is modified into the uplink talker bearer establishment and bearer establishment completion message; then step 606 is executed, and the name of the message is modified into the talker bearer identifier and uplink talker bearer mapping request message; finally, step 608 is executed, the name of the message is modified into the talker bearer identifier and uplink talker bearer mapping response message. Furthermore, the "group status update" in FIG. 6 may be executed after the "establish an access network bearer for a talker"; at this time, step 609 is an optional step, and meanwhile step 607 can be deleted.

Furthermore, different from that in FIG. 6, the trunking management server initiates establishment of an uplink EPS bearer for a talker (step 419 to step 422), in an optional embodiment, at the same time of executing step 601: send an uplink floor application request, the trunking UE may initiate a talker EPS bearer establishment request to the access network, and establish an uplink EPS bearer for the talker UE through interaction with the eNB, the MME, the PDN gateway and the serving gateway of the access network.

The process shown in FIG. 6 may be processed in parallel with the foregoing process shown in FIG. 4A-1 and FIG. 4A-2.

Figure 7:
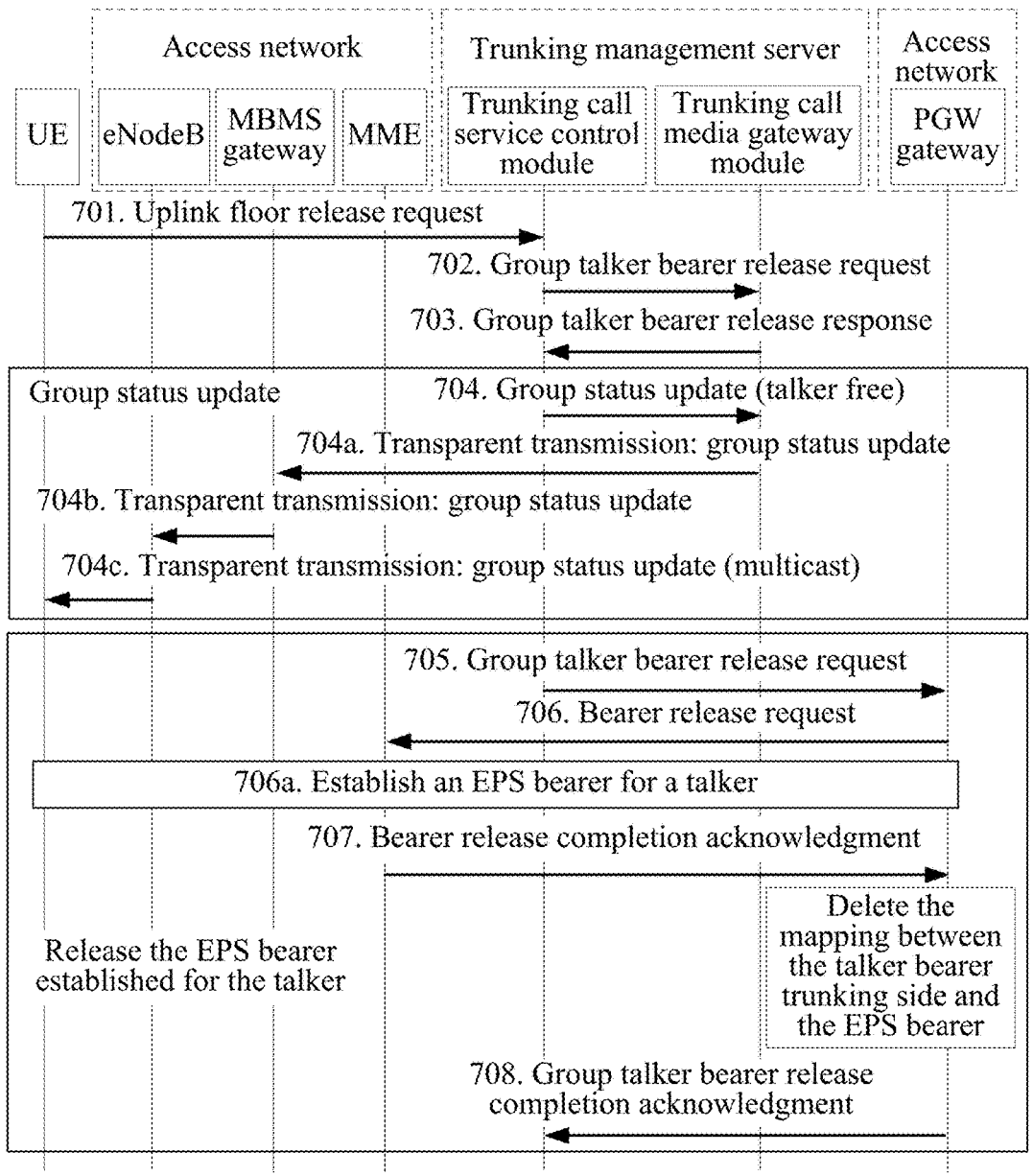
FIG. 7 is a flow chart of a fifth embodiment of a trunking communication method according to the present invention.

Referring to FIG. 7, it is a flow chart of a fifth embodiment of a trunking communication method according to the present invention, and this embodiment describes an uplink talker floor release procedure during trunking communication.

Step 701: A talker UE sends an uplink floor release request message to a trunking call service control module based on a protocol stack A, where the uplink floor release request message includes a group identifier, a calling identity, a group call type, and a service identifier.

Step 702: The trunking call service control module sends a group talker bearer release request message to a trunking call media gateway module, where the group bearer establishment request message is used to request releasing an uplink bearer identifier allocated to a talker.

Step 703: The trunking call media gateway module sends a group talker bearer release response message to the trunking call service control module.

Step 704: The trunking call service control module sends a group status update message to the trunking call media gateway module, where the message includes a group identifier, an talker status, talker identity information, and a talker priority.

Step 704a: The trunking call media gateway module transparently transmits the group status update message to an MBMS gateway.

Step 704b: The MBMS gateway transparently transmits the group status update message to the eNodeB.

Step 704c: The eNodeB multicasts the group status update message to the UE in the group.

Step 705: The trunking call service control module sends a group talker bearer release request message to a PDN gateway.

Step 706: The PDN gateway forwards the group talker bearer release request message to an MME.

Step 706a: The MME releases an EPS bearer established for the talker UE.

Step 707: The MME returns a talker bearer release completion message to the PDN gateway, so that the PDN gateway deletes a mapping between a talker bearer trunking and the EPS bearer.

Step 708: The PDN gateway forwards the talker bearer release completion message to the trunking call service control module.

Figure 8:
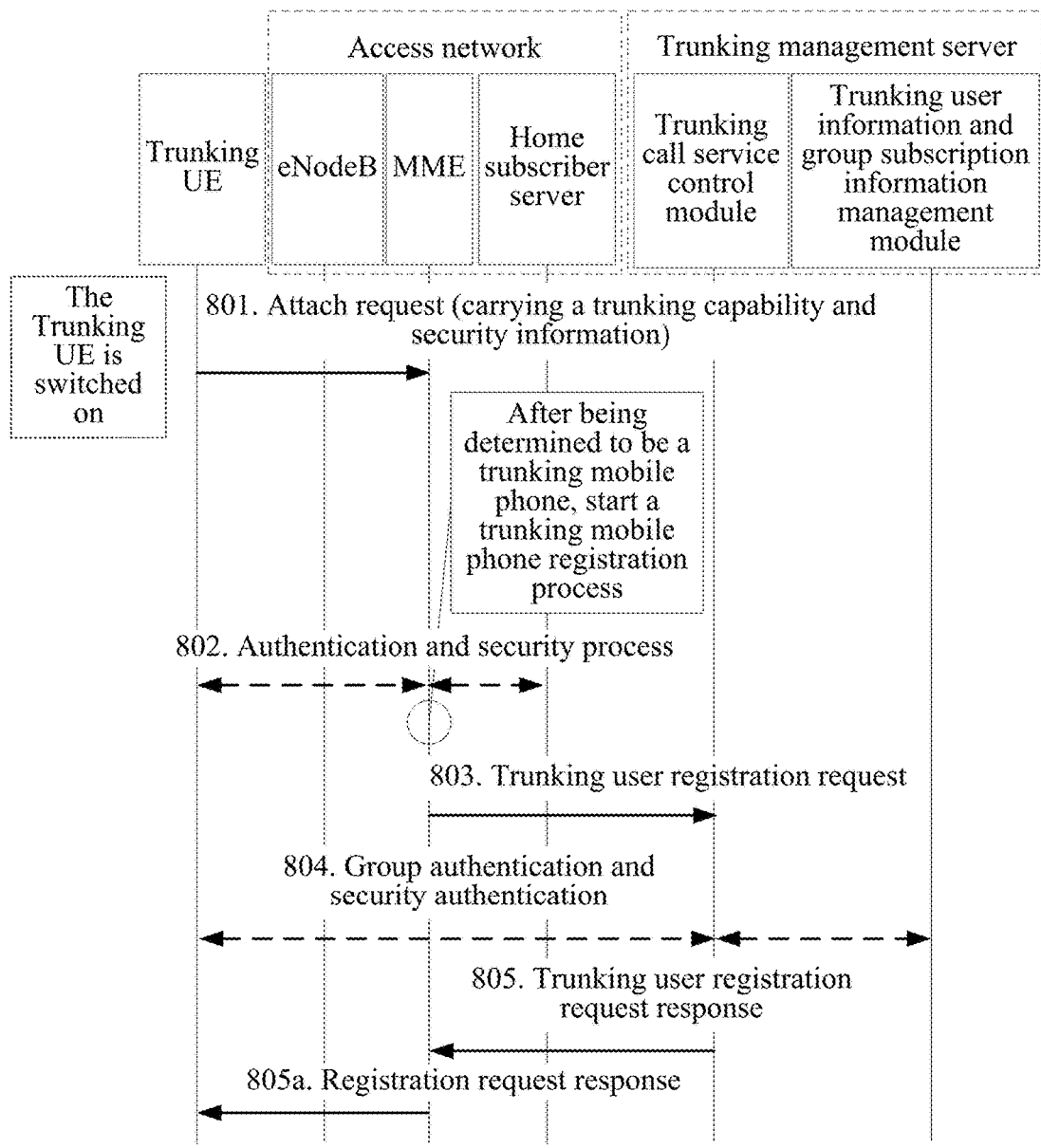
FIG. 8 is a flow chart of a sixth embodiment of a trunking communication method according to the present invention.

Referring to FIG. 8, it is a flow chart of a sixth embodiment of a trunking communication method according to the present invention, this embodiment describes a registration procedure of a trunking UE at the time of implementing trunking communication, and the trunking UE in this embodiment does not know an IP address of the trunking call service control module in advance.

Step 801: A trunking UE sends, after being switched on, an attach request (Attach Request) message to an MME, where the attach request message contains a UE trunking capability identifier and security information.

Step 802: Complete an authentication and security process (Authentication/Security) in an LTE network between the trunking UE, the MME and a home subscriber server.

Step 803: The MME sends, after identifying the trunking UE according to the UE trunking capability identifier, a trunking user registration request message to the trunking call service control module, where the trunking user registration request message contains an identity identifier for uniquely identifying a trunking UE, such as, an international mobile subscriber identity (International Mobile Subscriber Identity, IMSI).

Step 804: Perform group authentication and security authentication (Authentication/Security) between the trunking UE, the trunking call service control module, and a trunking user information and group subscription information management module.

Step 805: The trunking call service control module sends a trunking user registration request response message to the MME, where the trunking user registration request response message includes the IP address of the trunking call service control module.

Step 805*a*: The MME forwards the trunking user registration request response message to the trunking UE.

Figure 9:
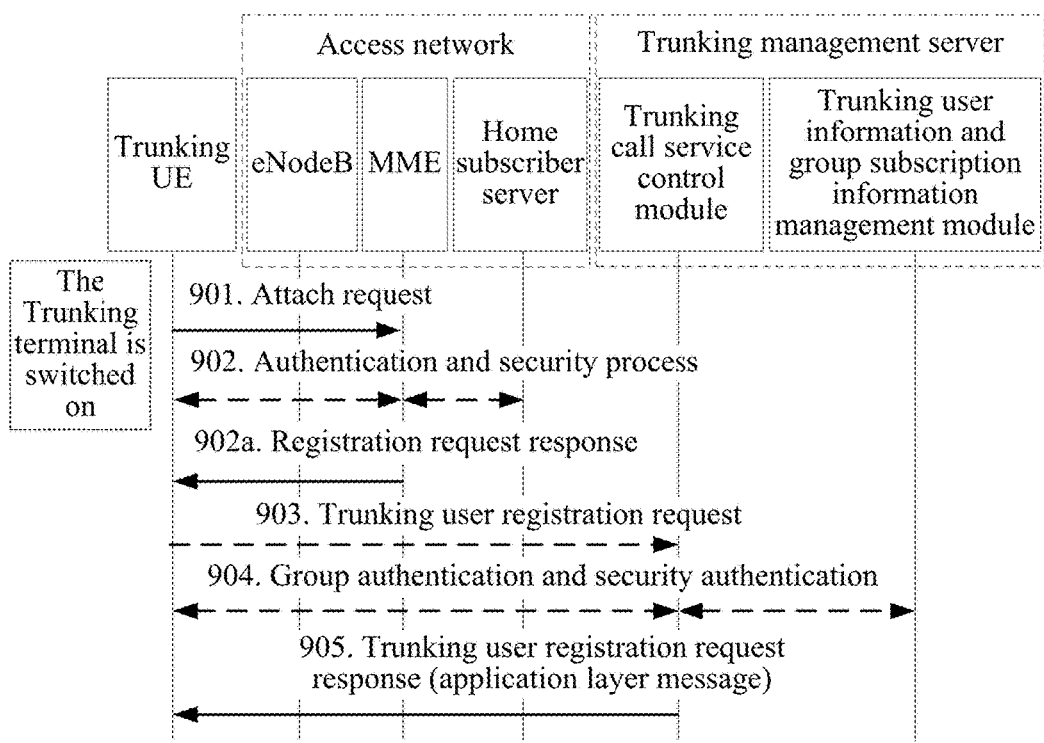
FIG. 9 is a flow chart of a seventh embodiment of a trunking communication method according to the present invention.

Referring to FIG. 9, it is a flow chart of a seventh embodiment of a trunking communication method according to the present invention, this embodiment describes another registration procedure of a trunking terminal during trunking communication, and the trunking UE in this embodiment knows an IP address of the trunking call service control module in advance.

Step 901: A trunking UE sends, after being switched on, an attach request (Attach Request) message to an MME, where the attach request message contains a UE trunking capability identifier and security information.

Step 902: Complete an authentication and security process (Authentication/Security) in an LTE network between the trunking UE, the MME and a home subscriber server.

Step 902*a*: The MME returns an attach request response message to the trunking UE.

Step 903: The trunking UE sends a trunking user registration request message to the trunking call service control module.

Step 904: Perform group authentication and security authentication (Authentication/Security) between the trunking UE, the trunking call service control module, and a trunking user information and group subscription information management module.

Step 905: The trunking call service control module returns a trunking user registration request response message to the trunking UE, where the trunking user registration request response message may include the IP address of the trunking call service control module.

In the foregoing group communication embodiment, the trunking call control module is mainly responsible for group status management, and the following may be implemented through status management: in one aspect, status information of current trunking service running is provided to the trunking UE for convenience of scheduling or statistics; in the other aspect, the current group status information may be published to the access network, for example, the group UE applies for the talker floor at appropriate time according to group talker status information.

A group status management function is classified into user-level status management (user-level), and group-level status management group-level, and the following Table 1 is an example of a kind of group status management function:

TABLE 1

| Status management function name | Description | Attribute |
| --- | --- | --- |
| Registration/ deregistration attached/detached | If a user registers successfully in a trunking management module, the user is in a registered status; otherwise the user is in a deregistration status | user-level |
| Point call being busy/free dedicated (busy/free) | If a user is performing a point call service (talking/receiving), the user is in a point call busy status; otherwise the user is in a point call free status | user-level |
| Group call talker group transmission | If a user is authorized to become a group talker, the user is in a group call talker status | user-level |

TABLE 1-continued

| Status management function name | Description | Attribute |
| --- | --- | --- |
| Group call received group received | If a user as a group monitor is receiving a service sent by a talker of the group, the user is in a group call received status | user-level |
| Group start/end group start/end | After the group service is started, the group is in a start status, and when the group service is ended, the group returns back to the group end status again | group-level |
| Group talker being busy/free uplink busy (trigger ID, trigger priority)/free | If no member in the group is authorized as a talker, the group talker is free; if a member in the group is authorized as a talker, the group talker is busy, and it is required to notify other members of the group of identity information and priority related information of the talker | group-level |

In the embodiment of the present invention, the trunking call service control module manages the group status, and management for each status shown in the above Table 1 is described separately below:

attached/detached: it is completed through a trunking UE registration and deregistration process shown in the foregoing embodiment;

dedicated (busy/free): the trunking call service control module decides whether to handle a point call initiation and end request, identifies whether a UE performs a point call service; the LTE access network transparently transmits a trunking application layer message such as point call initiation and point call end of a group UE and point call service data based on the protocol stack A, and if the application layer interaction is interrupted or timed out, the trunking call service control module may request, from the MME, status information of a relevant UE in the access network through the SGt interface to assist the relevant UE in status management;

group transmission: the trunking call service control module decides a group in which a UE is authorized with the group talker floor, and the trunking call service control module may identify whether a UE is in a group call talker status; the LTE access network transparently transmits talker application and talker release of a trunking UE, and a group application layer message such as talker floor grant based on the protocol stack A;

group received: according to a current group service status, talker status information, or active status feedback information of the trunking UE, the trunking call service control module determines whether the trunking UE is in a group received status. If a trunking UE is not granted as a talker UE of the group after a group service is initiated, the trunking UE is in the group received status by default; the trunking UE may also be required to actively report, after receiving a group service initiation notification, to the trunking call service control module through an application layer message that the trunking UE itself has accessed the group, thereby assisting the trunking call service control module in completing maintenance for the group received status; if the trunking UE actively exits the group service, the application layer message may be sent based on the protocol stack A, to notify the trunking call service control module that the trunking UE has exited the group, so that the trunking call service control module updates the status of the UE. Additionally, the trunking call service control module may also send a request to the MME through the SGt interface, so as to obtain a current monitoring UE status (ECM-IDLE/

CONNECTED) of a group, and the MME may inform the trunking call service control module of a relevant UE status through the SGt interface;

group start/end: the trunking call service control module maintains the service status of the group, and the LTE access network transparently transmits a trunking application layer message such as a group talker status based on the protocol stack B;

uplink busy (trigger ID, trigger priority)/free: the trunking call service control module maintains talker floor status management of the group, and the LTE access network transparently transmits a trunking application layer message such as a group talker status based on the protocol stack B, where after the trunking call service control module performs the talker application response, talker authorization or release operation, the group talker status may be updated in the LTE access network; If no UE in the group is authorized as a talker UE, the group talker UE is free; if a UE in the group is authorized as a talker UE, the group talker UE is busy, and identity information and priority related information of the talker UE may be notified to other UEs of the group.

The group status update process is already described in the embodiments in FIG. 6 (step 604 to step 604*c*) and FIG. 7 (step 704 to step 704*c*) above, and no more details are given here.

Corresponding to the embodiment of the trunking communication system and the embodiment of the trunking communication method of the present invention, the present invention further provides an embodiment of a trunking management server and an embodiment of an access network, and for specific implementation manners and functions of the embodiments of the trunking management server and the access network, reference can be made to the description of the embodiments shown in FIG. 1 to FIG. 9.

Figure 10:
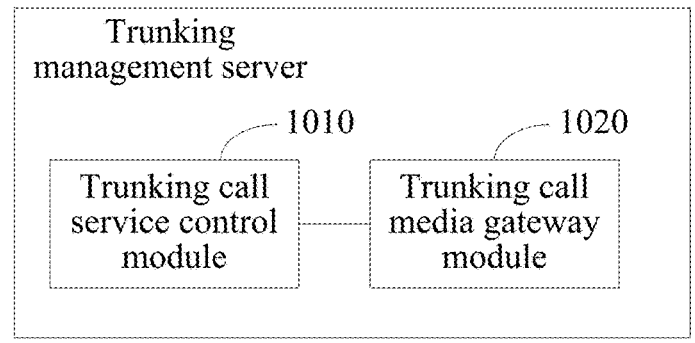
FIG. 10 is a block diagram of an embodiment of a trunking management server according to the present invention.

Referring to FIG. 10, it is a block diagram of an embodiment of a trunking management server according to the present invention.

The trunking management server includes: a trunking call service control module 1010 and a connected trunking call media gateway module 1020.

The trunking call media gateway module 1020 is configured to receive service data sent through the access network by a UE among trunking UEs, and forward the service data according to a communication type of the service data, so as to implement user plane communication of the trunking UE.

The trunking call service control module 1010 is configured to receive a communication request sent through the access network by a UE among the trunking UEs, and perform call control and bearer management on the trunking UE according to a communication type of the communication request, so as to implement control plane communication of the trunking UE.

Specifically, the trunking call media gateway module 1020 can be specifically configured to: when the communication type is point-to-point communication, forward service data, sent by a talker UE among the trunking UEs, to a called UE among the trunking UEs through the access network; and when the communication type is point-to-multipoint communication, multicast service data, sent by a talker UE among the trunking UEs, to a monitoring UE among the trunking UEs through the access network.

Specifically, the trunking call service control module 1010 can be specifically configured to when the communication type is point-to-point communication, send a unicast bearer establishment request or unicast bearer release request of a UE among the trunking UEs to the access network, so that the access network establishes an EPS bearer for the UE, or releases an established EPS bearer; and when the communication type is point-to-multipoint communication, send a trunking service initiation request to the access network through the trunking call media gateway module, so that the access network establishes a downlink multicast bearer for the trunking service according to the request, and allocates a resource to the trunking service.

Figure 11:
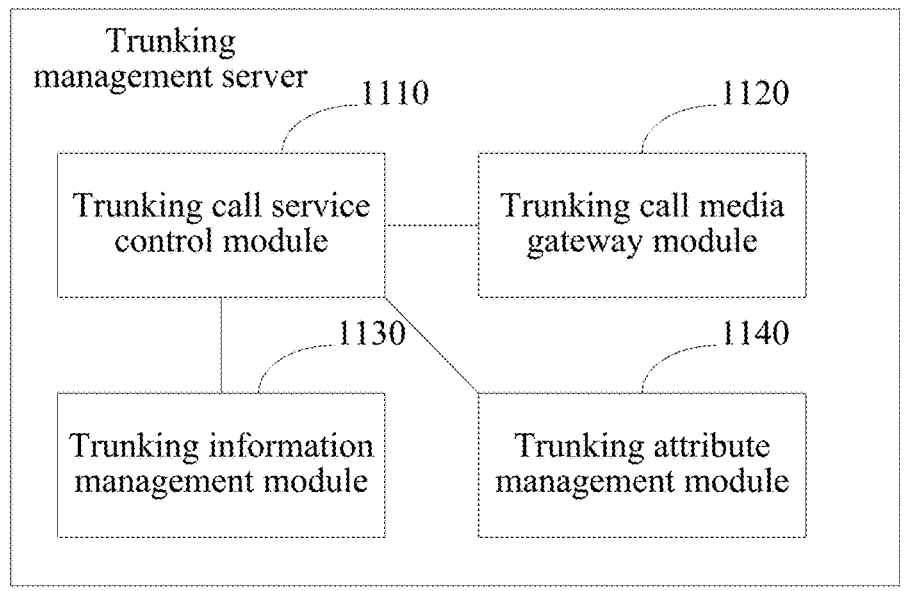
FIG. 11 is a block diagram of another embodiment of a trunking management server according to the present invention.

Referring to FIG. 11, it is a block diagram of another embodiment of the trunking management server of the present invention.

The trunking management server includes: a trunking call service control module 1110, a connected trunking call media gateway module 1120, a trunking information management module 1130 and a trunking attribute management module 1140.

The trunking call media gateway module 1120 is configured to receive service data sent through the access network by a UE among trunking UEs, and forward the service data according to a communication type of the service data, so as to implement user plane communication of the trunking UE.

The trunking call service control module 1110 is configured to receive a communication request sent through the access network by a UE among the trunking UEs, and perform call control and bearer management on the trunking UE according to a communication type of the communication request, so as to implement control plane communication of the trunking UE.

The trunking information management module 1130 is configured to manage definition, storage and update of trunking UE information and trunking subscription information, where the subscription information includes a group identifier, a group UE list, a trunking UE identity identifier, and a trunking UE priority definition.

The trunking attribute management module 1140 is configured to manage definition, storage, and update of group attribute information, where the attribute information includes a group identifier, a group priority, a group area, and a group service type.

Specifically, the trunking call media gateway module 1120 may be specifically configured to: when the communication type is point-to-point communication, forward service data, sent by a talker UE among the trunking UEs, to a called UE among the trunking UEs through the access network; and when the communication type is point-to-multipoint communication, multicast service data, sent by a talker UE among the trunking UEs, to a monitoring UE among the trunking UEs through the access network.

Specifically, the trunking call service control module 1110 may be specifically configured to: when the communication type is point-to-point communication, send a unicast bearer establishment request or unicast bearer release request of a UE among the trunking UEs to the access network, so that the access network establishes an EPS bearer for the UE, or releases an established EPS bearer; and when the communication type is point-to-multipoint communication, send a trunking service initiation request to the access network through the trunking call media gateway module, so that the access network establishes a downlink multicast bearer for the trunking service according to the request, and allocates a resource to the trunking service.

Figure 12:
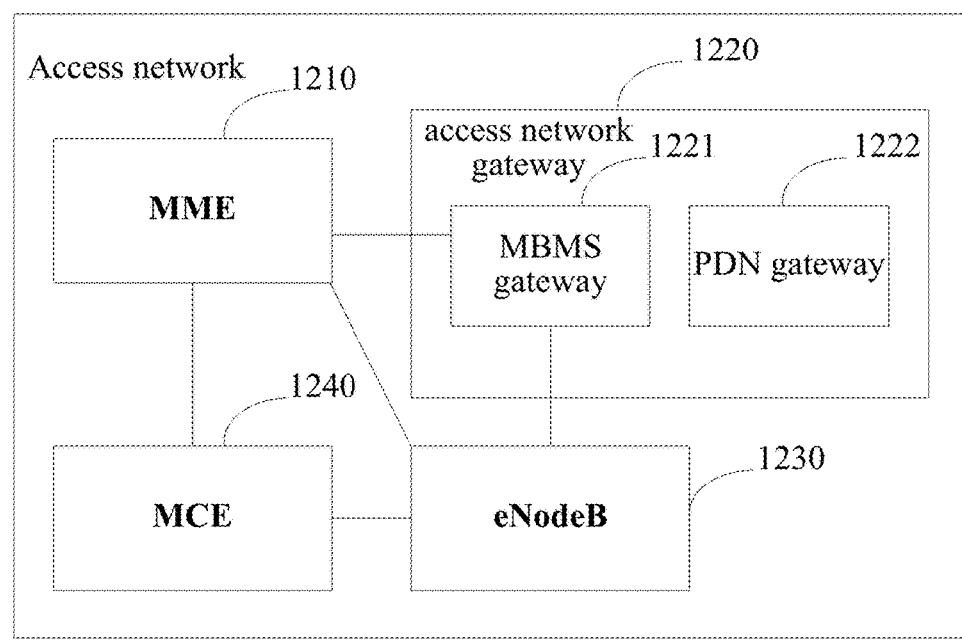
FIG. 12 is a block diagram of an embodiment of an access network according to the present invention.

Referring to FIG. 12, it is a block diagram of an embodiment of an access network according to the present invention.

The access network includes: an MME1210, an access network gateway 1220 and an eNodeB1230 which communicate with each other. The access network gateway 1220 includes a PDN gateway 1222 and an MBMS gateway 1221.

The access network gateway 1220 is configured to forward service data, sent by a trunking UE, to a trunking management server, so as to implement user plane communication of the trunking UE.

The MME1210 is configured to forward a communication request, sent by a trunking UE, to the trunking management server, so as to implement control plane communication of the trunking UE.

Further, the access network gateway may specifically include (not shown in FIG. 12): a serving gateway communicating with the PDN gateway 1222, where each of the serving gateway and the MBMS gateway 1221 communicates with the eNodeB1230 and the MME1210; the access network can further include: an MCE1240 communicating with the MME1210 and the eNodeB1230 separately.

Optionally, the PDN gateway 1220 is configured to: when user plane communication of the trunking UE is implemented, and a communication type is point-to-point communication, receive service data sent by a talker UE among the trunking UEs, and send the service data to the serving gateway; the serving gateway is configured to forward the service data to an eNodeB where a called UE among the trunking UEs is located; the eNodeB is configured to send the service data to the called UE; and the MBMS gateway is configured to: when user plane communication of the trunking UE is implemented, and a communication type is point-to-multipoint communication, receive service data sent by a talker UE among the trunking UEs, and send the service data to an eNodeB where a monitoring UE among the trunking UEs is located; the eNodeB is configured to multicast the service data to the monitoring UE.

Optionally, the PDN gateway 1220 is configured to: when control plane communication of the trunking UE is implemented, and the communication type is point-to-point communication, receive a unicast bearer establishment request or unicast bearer release request sent by the trunking UE, and establish an EPS bearer for the UE, or release an established EPS bearer.

The MBMS gateway 1210 is configured to: when control plane communication of the trunking UE is implemented, and the communication type is point-to-multipoint communication, receive a trunking service initiation request of the trunking UE sent by the trunking management server, and send the trunking service initiation request to the MME; the MME is configured to forward the trunking service initiation request to the MCE; the MCE is configured to establish a downlink multicast bearer for a trunking service of the trunking UE according to the trunking service initiation request, and allocate a resource to the trunking service.

It can be seen from the foregoing embodiments that, the trunking communication system in the embodiment of the present invention includes a trunking management server and an access network, the trunking management server includes a trunking call service control module and a connected trunking call media gateway module, and the access network includes an MME, an access network gateway and an eNodeB which communicate with each other, where the trunking call media gateway module receives service data sent through the access network by a trunking UE, and forwards the service data according to a communication type of the service data, so as to implement user plane communication of the trunking UE; and the trunking call service control module receives a communication request sent through the access network by a trunking UE, and performs call control and bearer management on the trunking UE according to a communication type of the communication request, so as to implement control plane communication of the trunking UE. In the embodiments of the present invention, user plane communication and control plane communication of the trunking UE may be implemented according to different communication types, so the trunking UE can be paged in a multicast manner in a trunking communication procedure, thereby improving access performance and access efficiency of the system. Correspondingly, a downlink service can be sent in a multicast manner, so occupancy on downlink channel resources in the system is also reduced.

Those skilled in the art can clearly understand that the technology in the embodiments of the present invention may be implemented by hardware only or by software and a necessary universal hardware platform. Based on such understandings, the technical solution in the embodiments of the present invention or the part that makes contributions to the prior art may be essentially embodied in the form of a software product. The software product may be stored in a storage medium, which can be an ROM/RAM, a magnetic disk, or an optical disk. The software product includes a number of instructions that enable a computer device (a personal computer, a server, or a network device) to execute the methods provided in the embodiments of the present invention.

The embodiments of the specification are described in a progressive manner, reference may be made between the same and similar parts of the embodiments, and what is emphasized in the description of each embodiment focuses on the part different from another part of other embodiments. Especially, for the system embodiment, since the system embodiment is basically similar to the method embodiment, the description is simple; for related parts, reference may be made to related description of the method embodiment.

The above implementation manners of the present invention do not constitute a limit to the protection scope of the present invention. Any modification, equivalent replacement, and improvement made within the spirit and principle of the present invention should all fall within the protection scope of the present invention.

What is claimed is:

1. A trunking communication system, comprising:
a trunking management server comprising a trunking call service control module connected to a trunking call media gateway module, wherein the trunking management server further comprises a trunking information management module and a trunking attribute management module configured to communicate with the trunking call service control module separately; and
an access network comprising a mobile management entity (MME), an access network gateway, and a base station (eNodeB) which communicate with each other, the access network gateway comprising a multimedia broadcast multicast service (MBMS) gateway and a public data network (PDN) gateway configured to communicate with the trunking call media gateway module, wherein the trunking call media gateway module is configured to communicate with the access network gateway, wherein the access network gateway further comprises a serving gateway configured to communicate with the PDN gateway, wherein each of the serving gateway and the MBMS gateway are configured to communicate with the eNodeB and the MME, and wherein the access network further comprises a multi-service customer edge (MCE) configured to communicate with the MME and the eNode B separately;

wherein the trunking call media gateway module is configured to:
receive service data through the access network from a first user equipment (UE) among at least one trunking UE,
forward the service data according to a communication type of the service data for implementing user plane communication of the at least one trunking UE, and
communicate with the MBMS gateway through an SGmb-i interface;
wherein the trunking call service control module is configured to:
receive a communication request through the access network from a second UE among the at least one trunking UE, and
perform call control and bearer management on the at least one trunking UE according to a communication type of the communication request; and
wherein the trunking call service control module is further configured to:
when the communication type is point-to-point communication, send a unicast bearer establishment request or unicast bearer release request of a third UE among the at least one trunking UE to the PDN gateway; and
when the communication type is point-to-multipoint communication, send an initiation request for a trunking service of the at least one trunking UE to the MBMS gateway through the trunking call media gateway module, wherein the MBMS gateway forwards the request to the MCE through the MME.

2. The system according to claim 1, wherein:
the trunking call service control module is configured to directly communicate with the access network gateway; or
the trunking call service control module is configured to communicate with the access network gateway through the trunking call media gateway module.

3. The system according to claim 1, wherein:
the trunking call service control module is configured to communicate with the MME through an SGt interface, or the trunking call service control module is configured to communicate with the MBMS gateway through an SGmb interface; and
the trunking call media gateway module is configured to communicate with the PDN gateway through an SGi interface.

4. The system according to claim 1, wherein:
the PDN gateway, the MBMS gateway, and the serving gateway are integrated in one network element; or
the MME and the MCE are integrated in one network element; or
the trunking attribute management module and the trunking call service control module are integrated in one network element.

5. The system according to claim 1, wherein the trunking call media gateway module is configured to:
when the communication type is point-to-point communication, send, to the PDN gateway, service data sent by a talker UE among the at least one trunking UE, wherein the PDN gateway forwards, through the serving gateway, the service data to an eNodeB where a called UE among the at least one trunking UE is located; and
when the communication type is point-to-multipoint communication, send, to the MBMS gateway, service data sent by a talker UE among the at least one trunking UE,
wherein the MBMS gateway sends the service data to an eNodeB where a monitoring UE among the at least one trunking UE is located.

6. The system according to claim 1, wherein:
the trunking information management module is configured to manage definition, storage, and update of trunking UE information and trunking subscription information, wherein the subscription information comprises at least one of: a group identifier, a group UE list, a trunking UE identity identifier, or a trunking UE priority definition; and
the trunking attribute management module is configured to manage definition, storage, and update of group attribute information, wherein the attribute information comprises at least one of: a group identifier, a group priority, a group area, or a group service type.

7. A trunking management server, comprising:
a trunking call service control module;
a trunking call media gateway module connected to the trunking call service control module;
wherein the trunking call media gateway module is configured to:
receive service data through an access network from a first user equipment (UE) among at least one trunking UE, and
forward the service data according to a communication type of the service data for implementing user plane communication of the at least one trunking UE, and
communicate with a multimedia broadcast multicast service (MBMS) gateway in the access network through an SGmb-i interface;
wherein the trunking call service control module is configured to:
receive a communication request through the access network from a second UE among the at least one trunking UE, and
perform call control and bearer management on the at least one trunking UE according to a communication type of the communication request; and
wherein the trunking call service control module is further configured to:
when the communication type is point-to-point communication, send a unicast bearer establishment request or unicast bearer release request of a third UE among the at least one trunking UE to the access network for the access network establishing an evolved packet system (EPS) bearer for the third UE, or releasing an established EPS bearer; and
when the communication type is point-to-multipoint communication, send an initiation request for a trunking service to the access network through the trunking call media gateway module for the access network establishing a downlink multicast bearer for the trunking service, and allocating a resource to the trunking service.

8. The server according to claim 7, wherein the trunking call media gateway module is configured to:
when the communication type is point-to-point communication, forward service data, sent by a talker UE among the at least one trunking UE, to a called UE among the at least one trunking UE through the access network; and
when the communication type is point-to-multipoint communication, multicast service data, sent by a talker UE among the at least one trunking UE, to a monitoring UE among the at least one trunking UE through the access network.

9. The server according to claim 7, further comprising:
a trunking information management module and a trunking attribute management module which are connected to the trunking call service control module separately;
wherein the trunking information management module is configured to manage definition, storage, and update of trunking UE information and trunking subscription information, wherein the subscription information comprises at least one of: a group identifier, a group UE list, a trunking UE identity identifier, or a trunking UE priority definition; and
wherein the trunking attribute management module is configured to manage definition, storage, and update of group attribute information, wherein the attribute information comprises at least one of: a group identifier, a group priority, a group area, or a group service type.

10. An access network, comprising:
a mobile management entity (MME), an access network gateway, and a base station (eNodeB) which communicate with each other, the access network gateway comprising a public data network (PDN) gateway and a multimedia broadcast multicast service (MBMS) gateway;
wherein the access network gateway is configured to forward service data, sent by a first user equipment (UE) among at least one trunking UE, to a trunking management server;
wherein the MME is configured to forward a communication request, sent by a second UE among the at least one trunking UE, to the trunking management server for implementing control plane communication of the at least one trunking UE;
a serving gateway configured to communicate with the PDN gateway, wherein each of the serving gateway and the MBMS gateway are configured to communicate with the eNodeB and the MME, and wherein the MBMS gateway is configured to communicate with a trunking call media gateway module of the trunking management server through an SGmb-i interface;
a multi-service customer edge (MCE) configured to communicate with the MME and the eNodeB separately;
wherein the PDN gateway is configured to:
  when control plane communication of the at least two trunking UEs is implemented and the communication type is point-to-point communication, receive a unicast bearer establishment request or unicast bearer release request sent by a third UE among the at least one trunking UEs, and establish an evolved packet system (EPS) bearer for the at least one trunking UEs, or release an established EPS bearer;
wherein the MBMS gateway is configured to:
  when control plane communication of the at least two trunking UEs is implemented and the communication type is point-to-multipoint communication, receive an initiation request for a trunking service of the at least two trunking UEs sent by the trunking management server, and send the initiation request to the MME;
wherein the MME is configured to forward the initiation request to the MCE; and
wherein the MCE is configured to establish a downlink multicast bearer for the trunking service of the at least two trunking UEs according to the initiation request, and allocate a resource to the trunking service.

11. The access network according to claim 10, wherein:
the PDN gateway is configured to when user plane communication of the at least one trunking UE is implemented and a communication type is point-to-point communication, receive service data sent by a talker UE among the at least one trunking UE and send the service data to the serving gateway;
the serving gateway is configured to forward the service data to the eNodeB where a called UE among the at least one trunking UE is located;
the eNodeB is configured to send the service data to the called UE;
the MBMS gateway is configured to when user plane communication of the at least one trunking UE is implemented and a communication type is point-to-multipoint communication, receive service data sent by a talker UE among the at least one trunking UE and send the service data to an eNodeB where a monitoring UE among the at least one trunking UE is located; and
the eNodeB is configured to multicast the service data to the monitoring UE.

* * * * *